United States Patent
Ben-Bassat et al.

(10) Patent No.: US 6,970,496 B1
(45) Date of Patent: Nov. 29, 2005

(54) RF MODEM AND COMMUNICATIONS TRANSCEIVER UTILIZING SAW DEVICE AND PULSE SHAPING

(75) Inventors: David Ben-Bassat, Yehud (IL); Moshe Lerner, Petach Tikva (IL)

(73) Assignee: RF Waves Ltd., Or Yehuda (IL)

( * ) Notice: Subject to any disclaimer, the term of this patent is extended or adjusted under 35 U.S.C. 154(b) by 1029 days.

(21) Appl. No.: 09/688,300

(22) Filed: Oct. 13, 2000

Related U.S. Application Data

(63) Continuation-in-part of application No. 09/419,824, filed on Oct. 15, 1999, now Pat. No. 6,535,545.

(51) Int. Cl.$^7$ ............................................. H04B 15/00
(52) U.S. Cl. ...................... 375/141; 375/238; 375/239; 370/205; 329/313
(58) Field of Search ................................ 375/140, 141, 375/142, 143, 146, 150, 151, 238, 239; 370/205; 329/313

(56) References Cited

U.S. PATENT DOCUMENTS

| | | | |
|---|---|---|---|
| 3,188,578 A | 6/1965 | Winsor, III | 331/39 |
| 4,602,220 A | 7/1986 | Kurihara | 331/19 |
| 4,703,327 A | 10/1987 | Rossetti et al. | 342/44 |
| 4,746,830 A | 5/1988 | Holland | 310/313 D |
| 5,434,893 A | 7/1995 | Le Roy et al. | 375/208 |
| 5,469,170 A | 11/1995 | Mariani | 342/51 |
| 5,617,871 A | 4/1997 | Burrows | 128/696 |
| 5,784,403 A | 7/1998 | Scott | 375/207 |
| 5,786,764 A | 7/1998 | Engellenner | 340/572 |
| 5,825,806 A | 10/1998 | Tuttle et al. | 375/200 |
| 5,844,482 A | 12/1998 | Guthrie et al. | 340/568 |
| 5,850,187 A | 12/1998 | Carrender et al. | 340/825.54 |
| 5,850,392 A | 12/1998 | Wang et al. | 370/335 |
| 5,874,896 A | 2/1999 | Lowe et al. | 340/572 |
| 5,892,792 A | 4/1999 | Walley | 375/206 |
| 5,909,461 A | 6/1999 | Koga et al. | 375/206 |
| 5,910,956 A | 6/1999 | Guthrie et al. | 370/445 |
| 5,912,644 A | 6/1999 | Wang | 342/457 |
| 5,912,921 A | 6/1999 | Warren et al. | 375/220 |
| 6,055,281 A | * 4/2000 | Hendrickson et al. | 375/329 |

FOREIGN PATENT DOCUMENTS

| | | | |
|---|---|---|---|
| EP | 0700154 | 3/1996 | H03H/9/64 |
| WO | 96/27957 | 9/1996 | H04B/15/00 |

* cited by examiner

*Primary Examiner*—Chieh M. Fan
*Assistant Examiner*—Kevin Kim
(74) *Attorney, Agent, or Firm*—Zaretsky & Associates PC; Howard Zaretsky

(57) ABSTRACT

A bidirectional direct sequence spread spectrum half-duplex RF modem that can be applied to transmit and receive numerous types of analog and digital pulse modulation. The modem incorporates a SAW based correlator for performing the spreading and de-spreading functions in the transmitter and receiver. A SAW resonator fabricated on the same monolithic substrate provides the frequency source for the oscillator. An upconverter/downconverter provides frequency translation to the desired frequency band. Pulse gating and interrogating pulse shaping are employed to reduce the spectral side bands of the transmitted spread pulse. The RF modem operates as an analog or digital pulse transmitter and receiver. It is adapted to be generic and is versatile enough to be used in many different types of data communication systems, such as OOK, PWM and PPM. The RF modem can be used as the physical (PHY) layer in a layered communication system such as the ISO OSI communication stack. In an alternative embodiment, the transmission bit rate is increased by using a plurality of correlators wherein each is configured with a unique function (i.e., code) that is orthogonal with all other functions.

59 Claims, 23 Drawing Sheets

RF MODEM AND COMMUNICATIONS TRANSCEIVER UTILIZING SAW DEVICE AND PULSE SHAPING

REFERENCE TO RELATED APPLICATIONS

This application is a Continuation-In-Part of U.S. Application Serial No. 09/419,824, filed Oct. 15, 1999, now U.S. Pat. No. 6,535,545, entitled "RF Modem Utilizing Saw Resonator and Correlator and Communications Transceiver Constructed Therefrom," similarly assigned and incorporated herein by reference in its entirety.

FIELD OF THE INVENTION

The present invention relates generally to a Radio Frequency (RF) modem and more particularly to a Surface Acoustic Wave (SAW) based spread spectrum RF modem incorporating an upconversion circuit and pulse shaping circuits for limiting the frequency output of the transmitted signal.

BACKGROUND OF THE INVENTION

As the use of computers continues to increase at a rapid rate, the demand for peripherals and systems connected via wireless connections continues to increase. The number of wireless applications is currently increasing at a very high rate in areas such as security alarms, networking, data communications, telephony and computer security.

Wireless communications currently may take many forms such as ultrasonic, IR and RF. A commonly used communication technique in RF wireless communications is spread spectrum. Spread spectrum communication is a communication technique whereby the transmitted signal is spread over a frequency band that is significantly wider than the minimum bandwidth required to transmit the information being sent. As a result of the signal spreading, spread spectrum systems have reduced susceptibility to interference and jamming thus enabling high levels of data integrity and security. Further, since the signal spreading process spreads the transmission power over a wide bandwidth, the power levels at any given frequency within the bandwidth are reduced significantly thereby reducing interference to other radio devices.

Spread spectrum communication systems are generally of the direct sequence (DS) type, the frequency hopping (FH) type or are a hybrid of the two that combines DS and FH. In direct sequence spread spectrum communications, a data signal is modulated with a pseudo random chip code so as to generate a transmitted signal whose frequency spectrum is spread over a wide bandwidth. The transmitted signal has a low spectral density and appears as noise to receivers lacking the code sequence. Thus, spread spectrum communications provides increased security for the data transmitted and reduced interface with other transmitters and receivers operating in the same environment.

The role of the transmitter in a spread spectrum communications system is to spread the signal in accordance with the data to be transmitted. Each bit or set of bits to be transmitted is converted into a plurality of chips having a much wider bandwidth than the original data. The spreading is performed in accordance with the code sequence chosen for the system.

The role of the receiver is to despread the spread spectrum signal in order to recover the original data signal. In direct sequence spread spectrum, the despreading of the signal is accomplished by correlating the received signal with a reference code matching the pseudo noise code used by the transmitter to transmit the information. As a consequence of de-spreading the signal, any interfering signals are also spread. The interfering signals typically comprise pseudo-random noise rather than cyclic noise that is easier to combat.

One technique for spread spectrum correlation is to convert the received signal into digital form before inputting it to a digital matched filter. Other spaced spread spectrum correlation techniques utilize surface acoustic wave (SAW) devices to perform correlation on a received spread spectrum signal. SAW devices, constructed on quartz wafers having a thickness of 0.5 mm, permit propagation of acoustical waves on the free surface. The SAW device functions to convert electrical signals into acoustical signals and back again via piezo electric transducers.

SAW devices are useful in a variety of applications including spread spectrum correlators since they are generally capable of operating over a wide bandwidth. A SAW correlator device is a passive component constructed to recognize a specific sequence of code chips (similar in operation to a digital matched filter correlator) via correlation of phase shifts in an RF signal. The SAW correlator functions analogously to a delay line matched filter. It consists of many delay elements each having a delay period equal to the period of the transmitted code clock such that, at any time, each element corresponds to a single chip of the received signal.

As the received signal propagates through the SAW device, the phase structure of each element is added in or out of phase with the propagated wave. The outputs of all the elements may be summed to reach a maximum at a total correlation value. When the phase shift structure of all the elements matches the phase shifts of the propagated wave, a maximum sum, i.e., correlation, is achieved.

Since SAW devices are by nature fixed devices, a SAW correlator is usually programmed at the time of manufacture to match a single predetermined chip code sequence. The phase shift structure of the SAW device is programmed at the time of construction through transducers placed in each element to produce an elemental phase match and cannot be charged once manufactured. Thus SAW devices generally permit correlation with a single code sequence.

It would therefore be desirable to have an RF modem that utilizes direct sequence spread spectrum techniques that can be constructed at low cost and small size. It is also desirable that such an RF modem utilizes SAW devices for both the transmitter resonator, transmitter correlator and receiver correlator thereby reducing the size and cost of the modem.

SUMMARY OF THE INVENTION

The present invention is a bidirectional direct sequence spread spectrum half-duplex RF modem. The RF modem can be utilized to transmit and receive numerous types of analog and digital pulse modulation. While the RF modem can be adapted to operate in numerous frequency ranges, a first example is presented herein that is constructed to operate in the 902 to 928 industrial, Scientific and Medical (ISM) hand of frequencies and a second example constructed to operate in the 2400 in 2483.5 MHz ISM band. In addition, examples are provided that utilize the RF modem of the present invention to construct various types of data communications systems.

A key feature of the present invention is the incorporation in the RF modem of two different Surface Acoustic Wave (SAW) devices fabricated on a single monolithic substrate.

A first SAW device is used as the resonator in the oscillator portion of the transmitter while a second SAW device forms the correlator for use in both the transmit and receiver portions of the modem. Another key feature of the invention is the very low amount of power consumed by the modem.

The RF modem is constructed to operate as a pulse transmitter and receiver. It is adapted to be generic in the sense that it is versatile enough to be used in many different types of data communication systems, several examples of which are presented below. The RF modem can be used as the physical (PHY) layer in a layered communication system such as the ISO OSI communication stack. As an example, the pulse transmitter RF modem, can be used to implement various modulation schemes including, but not limited to, On/Off Keying (OOK), Pulse Width Modulation (PWM), Pulse Position Modulation (PPM) or any other type of analog or digital pulse modulation.

In a first embodiment, the transmit portion of the modem comprises an oscillator that uses a SAW resonator device. The output of the oscillator is switched on and off in accordance with the data to be transmitted. The pulse is input to the SAW correlator that functions to output the spreading waveform comprising a code sequence. Effectively, the SAW correlator functions as a BPSK modulator. The code sequence used is a 13-bit Barker code that is adapted to have high autocorrelation properties. The spreading sequence is amplified and transmitted via an antenna.

At the receiver, the received signal is first filtered by a band pass filter before being amplified by a Low Noise Amplifier (LNA). The amplified signal is input to the matched filter/correlator where a match with the Barker code sequence is detected. If a match is detected, a de-spreading pulse is output representing the original pulse. The output of the correlator is input to a peak detector that functions to detect, in a either a linear or non-linear fashion the envelope of the received signal. A dynamic reference signal is generated and used to bias the threshold used to generate the binary output data signal.

The output power PT of the RF modem of the present invention is approximately 10 dBm. The processing gain is approximately 11 dB. In accordance with the FCC, providing a processing gain of at least 10 dB using direct sequence spread spectrum techniques permits the use of the higher output power level of 30 dBmi. Together, the effective output power $P_{TEFF}$ is on the order of 20 dBm. This translates to a maximum distance of communication (depending on actual conditions) of approximately 1000 meters in free space, assuming 0 dBi antennas. The maximum pulse rate achievable with the example RF modem presented herein constructed in accordance with the present invention is approximately 1.5 Mpps.

In a second embodiment, an upconverter/downconverter functions to translate the spread pulse to/from a higher frequency band. In addition, several techniques are used to narrow the frequency spectrum of the transmitted pulse. An interrogating pulse shaping circuit functions to smooth the contour of the interrogating pulse input to the SAW device. In addition, the structure of the SAW filter is adapted to smooth the transitions and discontinuities of the spreading waveform. Further, a pulse gating circuit functions to reduce the RF leakage generated by the SAW filter.

In a third embodiment, the transmission bit rate is increased by using a plurality of correlators wherein each is configured with a unique function (i.e., code) that is orthogonal with all other functions, i.e., they have near zero cross correlations with each other. The host is adapted to provide N data input and output lines. Each correlator having its own data input and output signal lines. The oscillator signal is generated by an oscillator circuit common to all correlators. An RF power splitter/combiner functions to combine the N transmission signals into a combined transmission signal and to split the received combined signal into multiple receive signals that are then fed to each correlator.

The RF modem of the present invention has a benefit of being relatively inexpensive to implement for the following reasons: (1) the size of both the required silicon and the SAW resonator and correlator devices are relatively small resulting in inexpensive manufacturing and high yield; (2) the high yield, as well as the simplicity of the devices, results in relatively simple testing of the components; and (3) the size of the resulting dies enables standard, inexpensive packaging.

The use of direct sequence spread spectrum technique provides numerous advantages, including the following: (1) the modem is adapted to transmit and receive very narrow pulses which is very desirable for pulse transceiving; (2) 10 dB is added to the effective transmission power per pulse due to the spread spectrum processing gain; (3) inherent immunity to interference; (4) inherent filtering of out of band noise; (5) inherent spreading of in-band noise; (6) a higher dynamic range available for communication; and (7) power savings resulting from fast oscillator wake-up time.

In addition, the RF modem of the present invention is capable of operating at any desired frequency band via the upconverter/downconverter and comprises circuitry to significantly reduce out of band RF energy.

There is thus provided in accordance with the present invention a direct sequence spread spectrum radio frequency (RF) modem comprising a pulse generator adapted to generate a pulse from an Intermediate Frequency (IF) oscillator signal having an IF frequency, the pulse generator comprising a first pulse shaping circuit adapted to shape the contour of the pulse, a pulse spreader adapted to spread the shaped pulse with a spreading code sequence waveform so as to generate a spread pulse, a transmitter circuit including an upconverter for mixing the spread pulse with a local oscillator (LO) signal having an LO frequency so as to generate a spread spectrum transmission signal at an RF frequency, a receiver circuit including a downconverter for mixing a received signal with the LO signal so as to generate a received spread pulse at the IF frequency, a correlator adapted to de-spread the received spread pulse in accordance with the code sequence so as to generate a correlator signal and a detector adapted to generate an output signal in response to the correlator signal.

There is also provided in accordance with the present invention a method of modulating and demodulating a direct sequence spread spectrum signal, the method comprising the steps of generating a pulse from an Intermediate Frequency (IF) oscillator signal having an IF frequency, wherein the contours of the pulse are shaped, spreading the shaped pulse with a spreading code sequence waveform and generating a spread pulse therefrom, mixing the spread pulse with a local oscillator (LO) signal having an LO frequency and generating therefrom a spread spectrum transmission signal at an RF frequency, mixing a received signal with the LO oscillator signal and generating therefrom a received spread pulse at the IF frequency, de-spreading the spread spectrum transmission signal in accordance with the code sequence and generating a correlator signal therefrom and detecting an output signal in response to the correlator signal.

There is further provided in accordance with the present invention a On/Off Keying (OOK) direct sequence spread spectrum radio frequency (RF) transceiver comprising an input circuit for generating a fixed duration data input signal in accordance with input data to be transmitted and an RF modem comprising a pulse generator adapted to generate a pulse in response to the data input signal from an Intermediate Frequency (IF) oscillator signal having an IF frequency, the pulse generator comprising a first pulse shaping circuit adapted to shape the contour of the pulse, a pulse spreader adapted to spread the shaped pulse with a spreading code sequence waveform so as to generate a spread pulse, a transmitter circuit including an upconverter for mixing the spread pulse with a local oscillator (LO) signal having an LO frequency so as to generate a spread spectrum transmission signal at an RF frequency, a receiver circuit including a downconverter for mixing a received signal with the LO oscillator signal so as to generate a received spread pulse at the IF frequency, a correlator adapted to de-spread the spread spectrum transmission signal in accordance with the code sequence so as to generate a correlator signal and a detector adapted to generate a data output signal in response to the correlator signal.

There is also provided in accordance with the present invention a Pulse Width Modulation (PWM) direct sequence spread spectrum radio frequency (RF) transceiver comprising an input circuit for generating a pulse width modulated data input signal in accordance with an analog input signal to be transmitted, an RF modem comprising a pulse generator adapted to generate a pulse in response to the data input signal from an Intermediate Frequency (IF) oscillator signal having an IF frequency, the pulse generator comprising a first pulse shaping circuit adapted to shape the contour of the pulse, a pulse spreader adapted to spread the shaped pulse with a spreading code sequence waveform so as to generate a spread pulse, a transmitter circuit including an upconverter for mixing the spread pulse with a local oscillator (LO) signal having an LO frequency so as to generate a spread spectrum transmission signal at an RF frequency, a receiver circuit including a downconverter for mixing a received signal with the LO oscillator signal so as to generate a received spread pulse at the IF frequency, a correlator adapted to de-spread the spread spectrum transmission signal in accordance with the code sequence so as to generate a correlator signal, a detector adapted to generate an output signal in response to the correlator signal and an output circuit operative to integrate the output signal so as to generate an analog output signal therefrom.

There is still further provided in accordance with the present invention a Pulse Position Modulation (PPM) direct sequence spread spectrum radio frequency (RF) transceiver comprising an input circuit for generating a pulse position modulated data input signal in accordance with an analog input signal to be transmitted, an RF modem comprising a pulse generator adapted to generate a pulse in response to the data input signal from an Intermediate Frequency (IF) oscillator signal having an IF frequency, the pulse generator comprising a first pulse shaping circuit adapted to shape the contour of the pulse, a pulse spreader adapted to spread the shaped pulse with a spreading code sequence waveform so as to generate a spread pulse, a transmitter circuit including an upconverter for mixing the spread pulse with a local oscillator (LO) signal having an LO frequency so as to generate a spread spectrum transmission signal at an RF frequency, a receiver circuit including a downconverter for mixing a received signal with the LO oscillator signal so as to generate a received spread pulse at the IF frequency, a correlator adapted to de-spread the spread spectrum transmission signal in accordance with the code sequence so as to generate a correlator signal, a detector adapted to generate an output signal in response to the correlator signal and an output circuit operative to threshold the output signal against a ramp function so as to generate an analog output signal therefrom.

There is also provided in accordance with the present invention a direct sequence spread spectrum radio frequency (RF) modem comprising an oscillator adapted to generate an Intermediate Frequency (IF) oscillator signal and a Local Oscillator (LO) signal, a plurality of N transmit/receive circuits, each the transmit/receive circuit comprising a pulse generator adapted to generate a pulse from the IF oscillator signal, the pulse generator comprising a first pulse shaping circuit adapted to shape the contour of the pulse, a pulse spreader adapted to spread the shaped pulse with a spreading code sequence waveform so as to generate a spread pulse, a correlator adapted to de-spread the spread pulse signal in accordance with the code sequence so as to generate a correlator signal, a detector adapted to generate an output signal in response to the correlator signal, wherein the correlator in each transmit/receive circuit is configured with a unique function substantially orthogonal to functions in other correlators, means for combining and transmitting the N spread pulse signals generated by the N transmit/receive, circuits as a combined transmission signal, a transmitter circuit including an upconverter for mixing the spread pulse with the LO signal so as to generate a spread spectrum transmission signal at an RF frequency, means for receiving and splitting the combined transmission signal into N receive signals, a receiver circuit including a downconverter for mixing a received signal with the LO signal so as to generate a received spread pulse at the IF frequency and wherein N is a positive integer.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
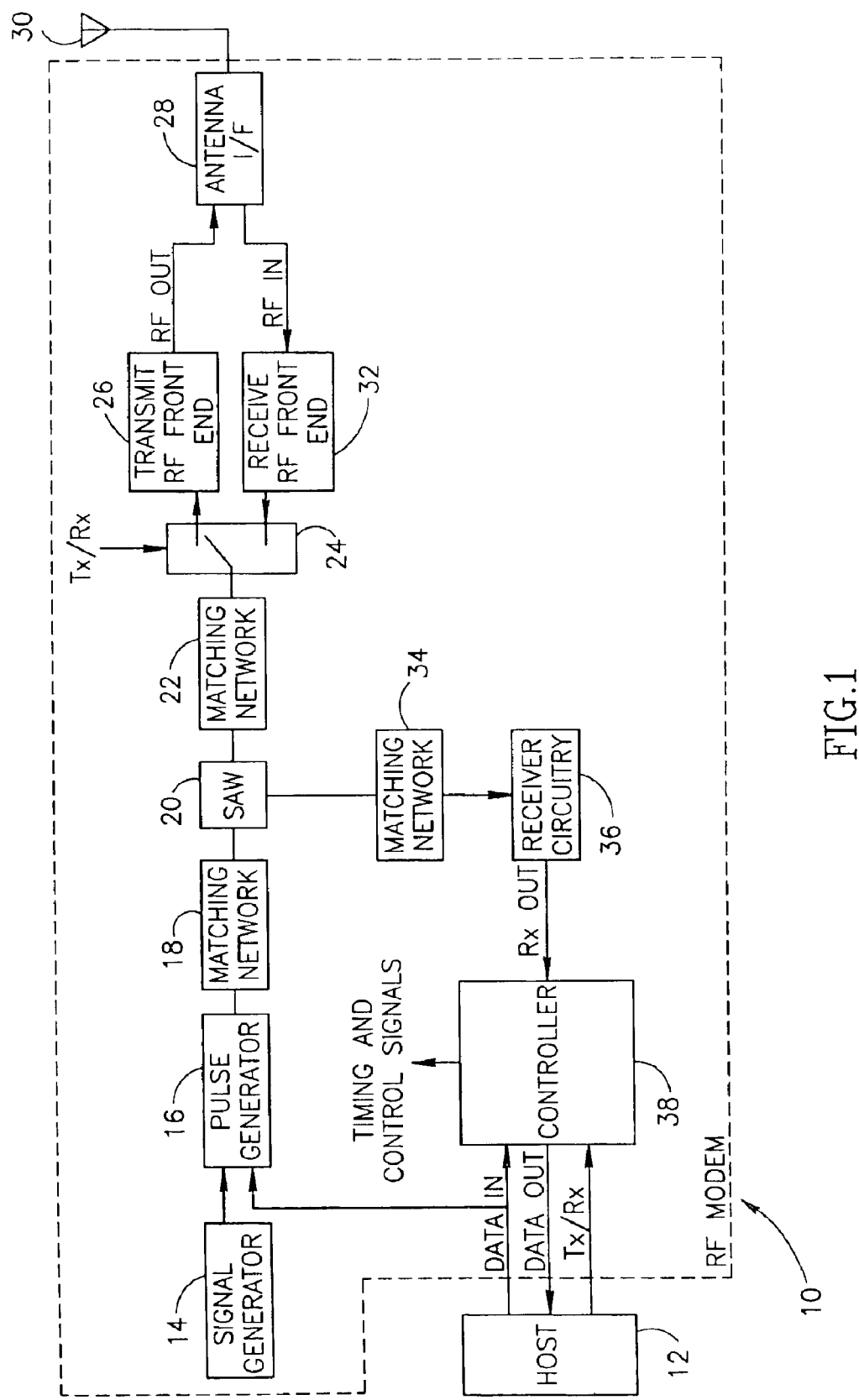
FIG. 1 is a block diagram illustrating a first embodiment of an RF modem constructed in accordance with the present invention.

The following notation is used throughout this document.

| Term | Definition |
| --- | --- |
| BPF | Band Pass Filter |
| BPSK | Binary Phase Shift Keying |
| CMOS | Complementary Metal Oxide Semiconductor |
| CNR | Carrier to Noise Ratio |
| DC | Direct Current |
| DS | Direct Sequence |
| FCC | Federal Communications Commission |
| FET | Field Effect Transistor |
| FH | Frequency Hopping |
| FM | Frequency Modulation |
| IF | Intermediate Frequency |

-continued

| Term | Definition |
| --- | --- |
| IL | Insertion Loss |
| IR | Infra Red |
| ISI | Intersymbol Interference |
| ISM | Industrial, Scientific and Medical band |
| ISO | International Standard Organization |
| LNA | Low Noise Amplifier |
| LO | Local Oscillator |
| MOSFET | Metal Oxide Semiconductor Field Effect Transistor |
| NF | Noise Figure |
| OOK | On/Off Keying |
| OSI | Open Systems Interconnection |
| PC | Personal Computer |
| PPM | Pulse Position Modulation |
| PWM | Pulse Width Modulation |
| RF | Radio Frequency |
| S/H | Sample and Hold |
| SAW | Surface Acoustic Wave |
| SNR | Signal to Noise Ratio |

The present invention is a bidirectional direct sequence spread spectrum half-duplex RF modem. The RF modem can be applied to transmit and receive numerous types of analog and digital pulse modulation. A first embodiment is presented comprising the core RF modem circuitry intended to operate at an RF frequency in the 902 to 928 MHz Industrial, Scientific and Medical (ISM) band of frequencies. A second embodiment is presented that comprises an upconverter/downconverter for translating the resultant spread pulse to a desired frequency band. While the RF modem can be adapted to operate in numerous frequency ranges, an example of the second embodiment is presented herein that is constructed to operate in the 2.4 GHz ISM band of frequencies. It is not intended, however, that the present invention be limited to such example implementations shown herein, as one skilled in the art can apply the principles of the present invention to construct RF modems having other frequencies of operation as well.

A third embodiment is presented whereby a plurality of pulse spreaders (i.e. correlators) are used in combination to increase the data rate. In addition, several application examples are provided that utilize the RF modem of the present invention to construct various types of data communications systems, such as OOK, PWM and PPM communications systems.

Several key features of the RF modem of the present invention include: (1) the incorporation in the RF modem of two different Surface Acoustic Wave (SAW) devices fabricated on a single monolithic substrate whereby a first SAW device is used to form the resonator in the transmitter portion of the modem while a second SAW device is used to form the correlator in the transmitter and receiver portions of the modem; (2) the very low amount of power consumed by the modem; (3) the very narrow pulse that is received during operation which results in improved SNR; and (4) the effective energy per bit transmitted is 10 dB above the transmitter energy, due to the processing gain of the modem.

In addition, the RF modem incorporates circuitry to reduce the RF energy of the transmitted pulse outside of the desired frequency band. An interrogating pulse shaping circuit is employed which functions to smooth the contour of the interrogating pulse input to the SAW device. In addition, the structure of the SAW correlator is adapted to smooth the transitions and discontinuities of the spreading waveform. Further, a pulse gating circuit functions to reduce the RF leakage generated by the SAW correlator.

First Embodiment RF Modem

A block diagram illustrating an RF modem constructed in accordance with a first embodiment of the present invention is shown in FIG. 1. The RF modem, generally referenced 10, comprises transmit circuitry and receive circuitry. A portion of the modem is shared by both the transmitter and the receiver, namely the SAW Correlator device.

The RF modem 10 is constructed to operate as a pulse transmitter and receiver. It is adapted to be generic in the sense that it is versatile enough to be used in many different types of data communication systems, several examples of which are presented hereinbelow. The RF modem can be used as the physical (PHY) layer in a layered communication system such as the ISO OSI communication stack.

As an example, the pulse transceiver RF modem 10, can be used to construct different types of communication systems, such as On/Off Keying (OOK), Pulse Width Modulation (PWM), Pulse Position Modulation (PPM) or other types of pulse modulation. Note that one skilled in the art can apply the RF modem of the present invention to construct other types of pulse modulation based communication systems as well. The transmit path of the RF modem will be described first followed by the receive path.

The data to be transmitted by the modem is provided by a host 12 and is input to the controller 38. The controller 38 comprises circuitry to generate the timing and control signals used in the modem. The controller also provides the interface to the host device. In the example modem presented herein, the controller is implemented as a state machine. Note that one skilled in: the art, however, can construct the controller in numerous other ways without departing from the scope of the invention.

The host may comprise any suitable digital data source such as a microcontroller, microprocessor, microcomputer, PC or other data computing means. The data rate output of the host can be any rate that the transmitter can support. In the example modem described herein, the data rate output from the host is a maximum of 1.5 Mbps. This assumes a correlator chip rate of 20 Mcps or 50 ns/chip. Using a 13-chip spreading code sequence to spread the pulse yields 13×50 650 ns/pulse. Thus, the maximum pulse rate of the modem is 1/650 ns≅1.5 Mbps.

A signal generator 14 functions to generate the oscillator and clock signals used by the modem, including the Radio Frequency (RF) signal. In the example RF modem shown herein, the RF signal is chosen to generate a transmit pulse in the 900 MHz ISM band, with a frequency equal to 915 MHz.

The pulse generator 16 functions to gate the RF signal in accordance with the input data to be transmitted. The SAW device 20 is a three port device and functions as the spreading and de-spreading element. Matching networks 18, 22, 34 function to electrically interface the SAW device to the pulse generator 16, Tx/Rx front end circuits 26, 32 and the receiver circuit 36, respectively.

In the transmit direction, the output of the pulse generator is input to the transmit RF front end 26 via the Tx/Rx switch 24. The transmit RF front end amplifies the pulse and outputs it to the antenna 30 via the antenna interface 28.

In the receive direction, the signal from the antenna 30 is amplified by the receive RF front end circuit 32 before being input to the SAW correlator 20 via the Tx/Rx switch 24. The resultant de-spread signal is input to the receiver circuitry 36 which functions to recover the received data.

Figure 2:
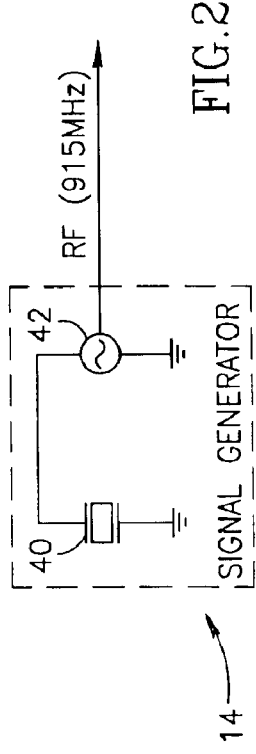
FIG. 2 is a block diagram illustrating the signal generator circuit of the RF modem in more detail.

A block diagram illustrating the signal generator circuit of the RF modem in more detail is shown in FIG. 2. The RF modem 10 operates as a pulse transmitter/receiver wherein a signal output by an oscillator is modulated in on/off fashion by an RF switch. The signal generator functions to provide the source for the generation of the RF oscillator signal used to generate the interrogation pulse to the SAW correlator and to provide the basic clock signals for the state machine in the controller. A frequency source 40 is coupled to an oscillator circuit 42. The frequency source may comprise any suitable device such as a quartz crystal, ceramic resonator, SAW resonator, etc. In this example, the signal generator 14 is a SAW-resonator based oscillator. The SAW resonator 190 (described infra in connection with FIG. 6) is used and implemented on the same substrate as the SAW correlator. Note that the oscillator may comprise a negative resistance oscillator. Alternatively, other types of oscillators may be used with the present invention. Note that the wake up time of the oscillator may be critical depending on the desired data rate. For example, to achieve a 1 Mbps data rate requires a wake up time of less then 10 microseconds.

The output of the oscillator comprises the RF oscillator signal (e.g., 915 MHz for use in the 900 MHz ISM band). Note that since the signals produced by the signal generator circuit are used by both the transmitter and the receiver, it is preferable that the circuit consumes minimal current.

Note that use of a SAW based resonator provides a good compromise between size, cost and performance. In this example embodiment, the center frequency of the SAW resonator is preferably 915 MHz with an accuracy of $\Delta f = \pm 0.1$ MHz. This frequency is in the middle of the 902 to 928 ISM band. Note that the invention can be adapted by one skilled in the art to operate in other frequency bands as well such as the 2.4 GHz ISM band. The quality factor (Q) is preferably such that the resonator 3 dB bandwidth is $\Delta f < 10$ MHz. The insertion loss (IL) is preferably IL<3 dB at the center frequency while the impedance $Z_0$ at the center frequency is less then 50 Ohm.

The SAW resonator is coupled to an oscillator circuit whose center frequency is 915 MHz with an accuracy of $\Delta f = \pm 0.1$ MHz. The 'wake up time' of the oscillator is preferably such that the output of the oscillator stabilizes (in terms of center frequency and output power) within 10 $\mu s$ from the time its power supply voltage (e.g., 3 V) is applied. The signal output of the oscillator is relatively low power, e.g., −30 dB and must be amplified.

In accordance with the frequency range of the example embodiment described herein, the oscillator is required to oscillate in a frequency range between 905 to 925 MHz. This range is approximately the bandwidth of the correlator. Consequently, this means that the resonator requires a Q of $\approx 20/900 \approx 2.2\%$. This is a relatively low Q, and is desirable as it permits a very short 'wake up time' for the oscillator. The use of a low Q resonator with short wake up time and a wideband correlator result in significant energy savings.

Figure 3:
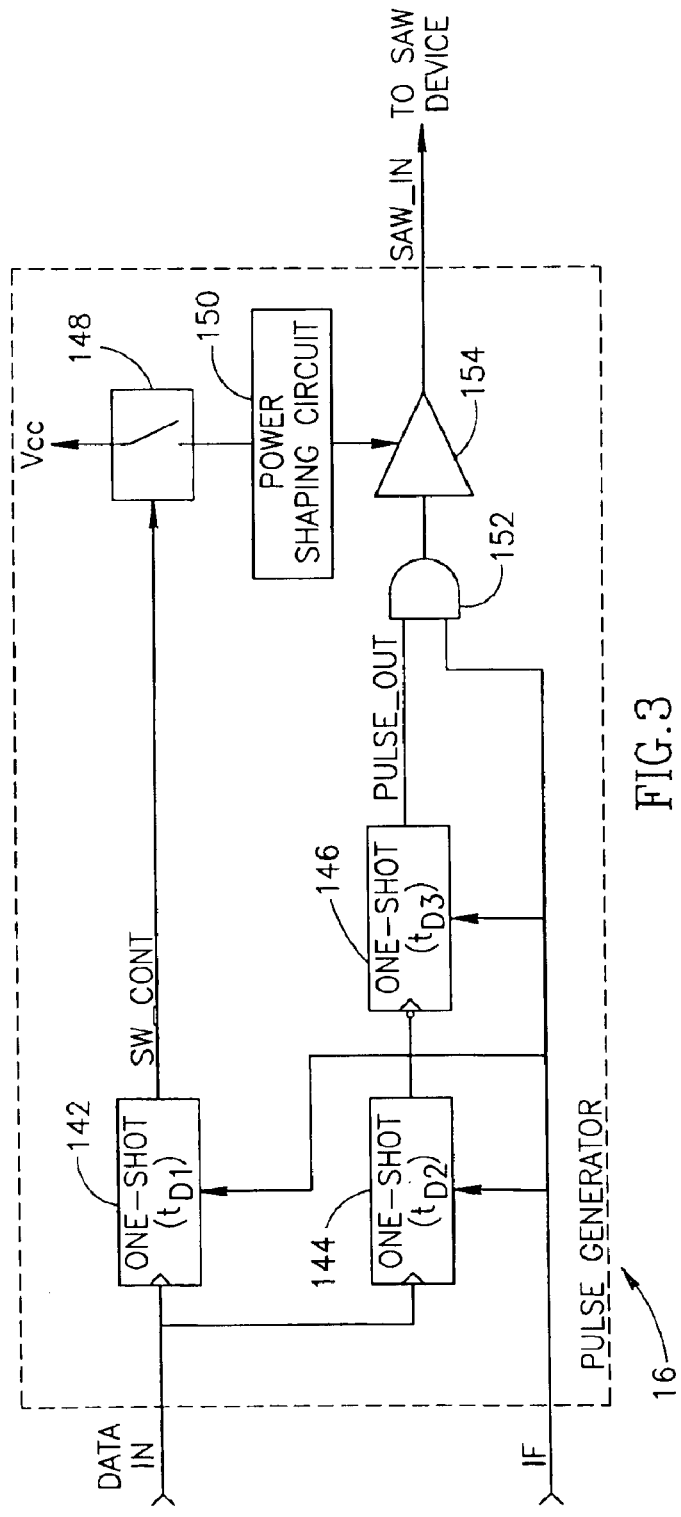
FIG. 3 is a block diagram illustrating the pulse generator circuit of the RF modem in more detail.

A block diagram illustrating the pulse generator circuit of the RF modem in more detail is shown in. FIG. 3. The pulse generator 16 functions to generate an approximately 100 ns RF pulse that is used to interrogate the SAW correlator. The circuitry of the pulse generator is positive edge triggered, i.e. a low to high transition of the data in line starts the sequence of generating a pulse. It can be implemented as a state machine comprising a timing mechanism that switches on and off the analog elements that generate the pulse. The pulse generator shown is an alternative implementation constructed using hardware elements rather than a state machine.

The input data from the host triggers two one shot devices 142, 144 (i.e. monostable multivibrators). A first non-retriggerable one shot 142 generates a signal SW_CONT having a duration $t_{D1}$. A second non-retriggerable one shot 144 generates a pulse having a duration $t_{D2}$ which subsequently triggers a third non-retriggerable one shot 146. The output pulse labeled PULSE_OUT has a high duration of $t_{D3}$. One-shot 144 provides the setup time for the SAW amplifier 154 to stabilize.

The PULSE_OUT signal from one-shot 146 is gated with the RF oscillator signal via AND gate 152. The resulting gated interrogating pulse is input to a non-differential power amplifier 154 which is matched to provide maximum power to the input of the SAW correlator. The output of the amplifier 154, labeled SAW_IN, is input to the SAW correlator.

In accordance with the present invention, the contour of the interrogating pulse is shaped so as to lower the spectral density of the side band frequencies. A power shaping circuit 150 controls the power to the amplifier 154 so as to give the interrogating pulse a ramp-up and ramp-down envelope. Power from $V_{CC}$ to the shaping circuit is controlled by the SW_CONT signal from one-shot 142.

Figure 4:
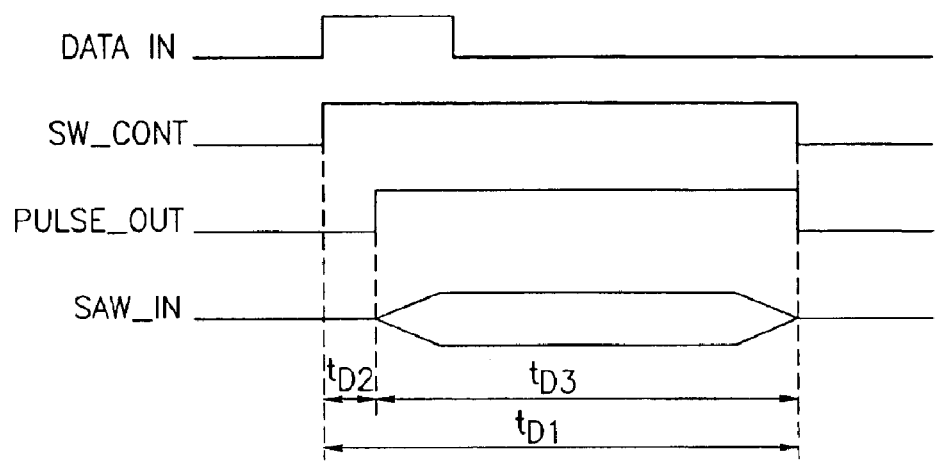
FIG. 4 is a diagram illustrating waveform traces of signals of the pulse generator circuit.

Illustrating waveform traces of the signals of the pulse generator circuit 16 are shown in FIG. 4. The resulting interrogating pulse SAW_IN comprises three portions. In the example modem presented herein, the ramp-up and ramp-down portions have a duration of approximately 30 ns while the constant inner portion has a duration of approximately II 5 ns (i.e. 56 cycles of the RF).

Alternatively, the interrogating pulse is generated using an RF switch adapted to create short pulses of the RF signal. The pulse durations are approximately within a range of 0.5 to 2 chips (i.e., 25 to 100 ns). The RF switch preferably is adapted to provide high isolation of at least 50 dB from input to output when not in an 'on' state. The input impedance of the switch is preferably no lower than 10k Ohm and no higher than 5 pF. The output impedance is preferably 50 Ohm. A positive input on the control input on the Data In Signal places the switch in the on or conducting state. Alternatively, the switch can be adapted to turn on when a negative or zero signal is input to the control input.

Thus, in response to the Data In signal, the switch is adapted to output a low power pulse carrier signal, i.e., the interrogating pulse, whose width is within a range of approximately 0.5 to 2 chips (i.e., 25 to 100 ns). This signal is then amplified by a switched amplifier. The amplifier is adapted to amplify the weak −30 dBm input signal output from the switch to an output power of approximately 10 to 15 dBm. The central frequency of operation of the amplifier is 915 MHz with a bandwidth of at least 50 MHz. The output impedance is preferably 50 Ohm. The wake up time of the amplifier is preferably 100 ns, i.e., the amplifier is stable according to specification within 100 ns. The high gain of the amplifier is required to overcome the insertion loss of the SAW correlator that may be as high as 15 to 20 dB.

Figure 5:
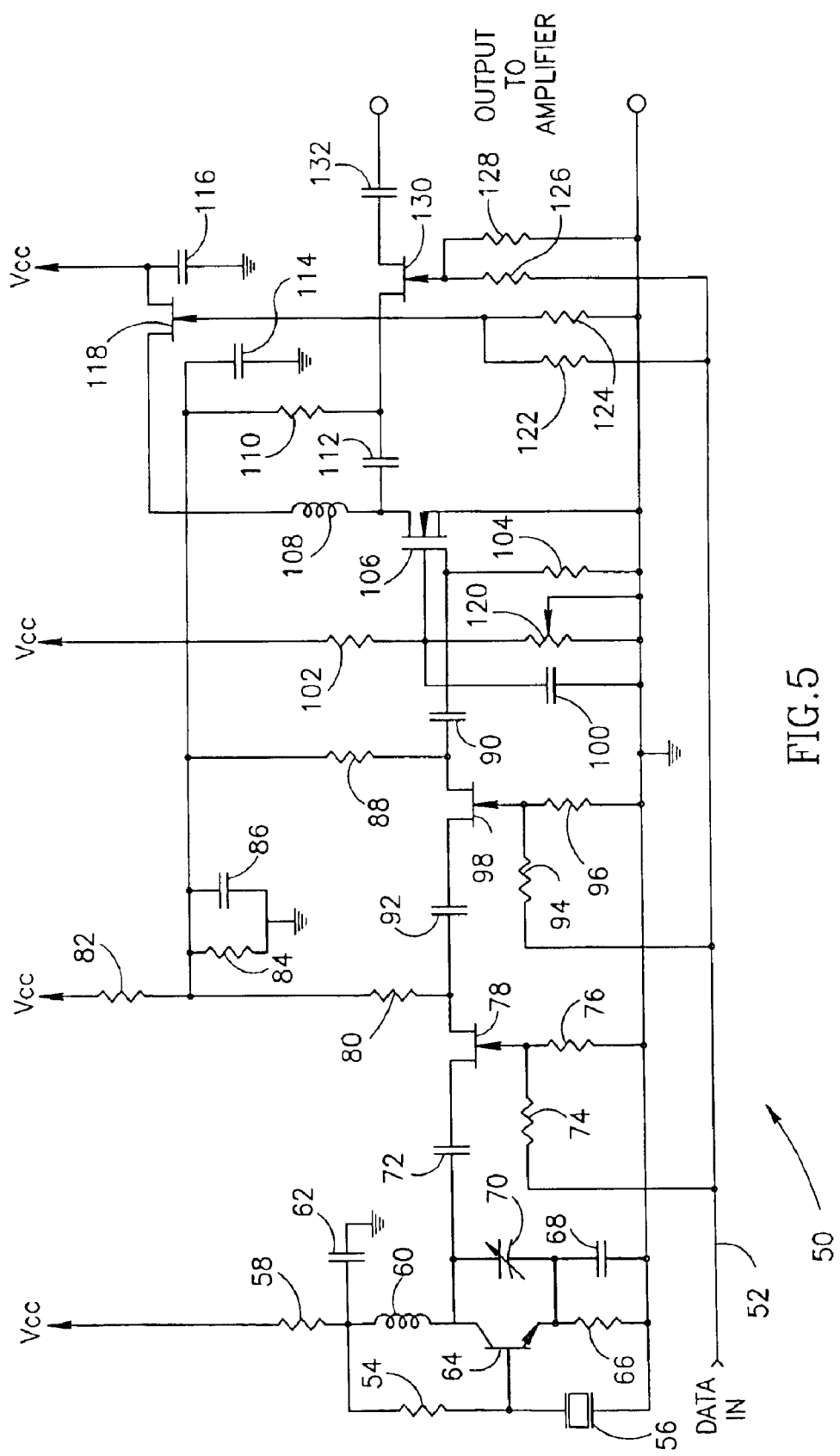
FIG. 5 is a schematic block diagram illustrating an example embodiment of the resonator, oscillator and RF switch portion of the RF modem of the present invention.

A schematic block diagram illustrating an example embodiment of the resonator, oscillator and RF switch is shown in FIG. 5. The circuit, generally referenced 50, comprises a frequency source 56 (i.e. SAW resonator) connected to the base of transistor 64.

A biasing resister 54 is connected to $V_{CC}$ through resister 58. The collector is connected to RF choke 60 and to capacitor 62 to ground. The RF choke and capacitor help isolate the RF energy from the power supply. The base of transistor 64 is coupled to a parallel combination of resister 66 and capacitor 68. The fixed capacitor 68 is connected is series to variable capacitor 70 connected across the collector. The resonator and transistor are adapted to form a negative impedance oscillator whose output is the signal on the collector. The transistor is configured to function as a positive feedback element in the circuit.

The resonator 56 may comprise any suitable resonator but is preferably a SAW resonator device whose center frequency determines the frequency of oscillation of the oscillator. The construction of the SAW resonator is described in more detail hereinbelow. The output of the oscillator is coupled via capacitor 72 to a first switch comprising FET transistor 78 whose gate is connected to ground via resister 76 and to the Data In signal via resistor 74. The source terminal is connected to $V_{CC}$ via a voltage divider comprising resisters 80, 82 coupled to RC comprising resister 84 and capacitor 86.

The output of FET 78 is coupled via coupling capacitor 92 to a second switch comprising FET transistor 98 whose gate is connected to ground via resister 94 and to the Data In Signal via resistor 94. The source terminal is connected to $V_{CC}$ via a voltage divider comprising resisters 88, 82 coupled to RC comprising resister 110 and capacitor 114. Two cascaded switches are used in series to provide a high level of backward isolation when the switch is off. In the case when a single switch does not provide sufficient isolation, two stitches effectively double the isolation. Such a series combination can provide on the order of 50 dB of isolation between input and output. In addition, the switch is adapted to open relatively quickly, i.e., on the other of 2 ns.

The output of the second switch is input to one gate of a double gate n-channel enhancement MOSFET 106 via capacitor 90 connected to ground via resister 120. The other gate is coupled to ground via capacitor 100 and to a voltage divider comprising fixed resister 102 connected to $V_{CC}$ and variable resister 120 connected to ground. Transistor 106 is configured to amplify the oscillator signal. The source terminal of the transistor is connected to $V_{CC}$ (coupled to ground via capacitor 116) via FET switch 118 and RF choke 108. The RF choke helps isolate the transistor 106 from the power supply for RF frequencies. The gate of FET switch 118 is connected to a voltage divider connected between the Data In signal and ground via resisters 122, 124. The FET switch 118 functions to control DC power to transistor 106. The switch is configured to conduct only when the data on the Data In line is a high (i.e., a '1') thus reducing the power consumption of the amplifier.

The output of transistor 106 is coupled to an output FET switch 130 via coupling capacitor 112. The gate of the switch 130 is connected to a voltage divider connected between the Data In signal and ground via resisters 126, 128. The output of the switch is coupled to the amplifier stage via coupling capacitor 132.

A key feature of the RF modem of the present invention is that a single SAW correlator 20 is used for both transmission and receiving. When the modem is in the transmitting state, the interrogating pulse is input to the tuning/impedance matching network 18. The matching circuit 18 functions to match the impedance at the output of the pulse generator 16 to the SAW device such that the input impedance seen by the SAW device is 50 Ohms.

The SAW correlator device is operative to output a signal having a shape in accordance with characteristics of the SAW device. As described in more detail below, the SAW correlator is constructed to output a spread signal waveform representing a 13-bit Barker code. The modem, however, may be constructed using other spread spectrum codes as well. In response to the input interrogating pulse from the matching circuit 18, the SAW device is operative to output a spreading waveform much wider in time duration, e.g., 500 to 700 ns. The output of the SAW device 20 is input to a second tuning/impedance matching network 22 which functions to provide a 50 Ohm output impedance. The insertion loss of the SAW correlator may be as high as 15 to 20 dB.

SAW Resonator and Correlator Devices

Figure 6:
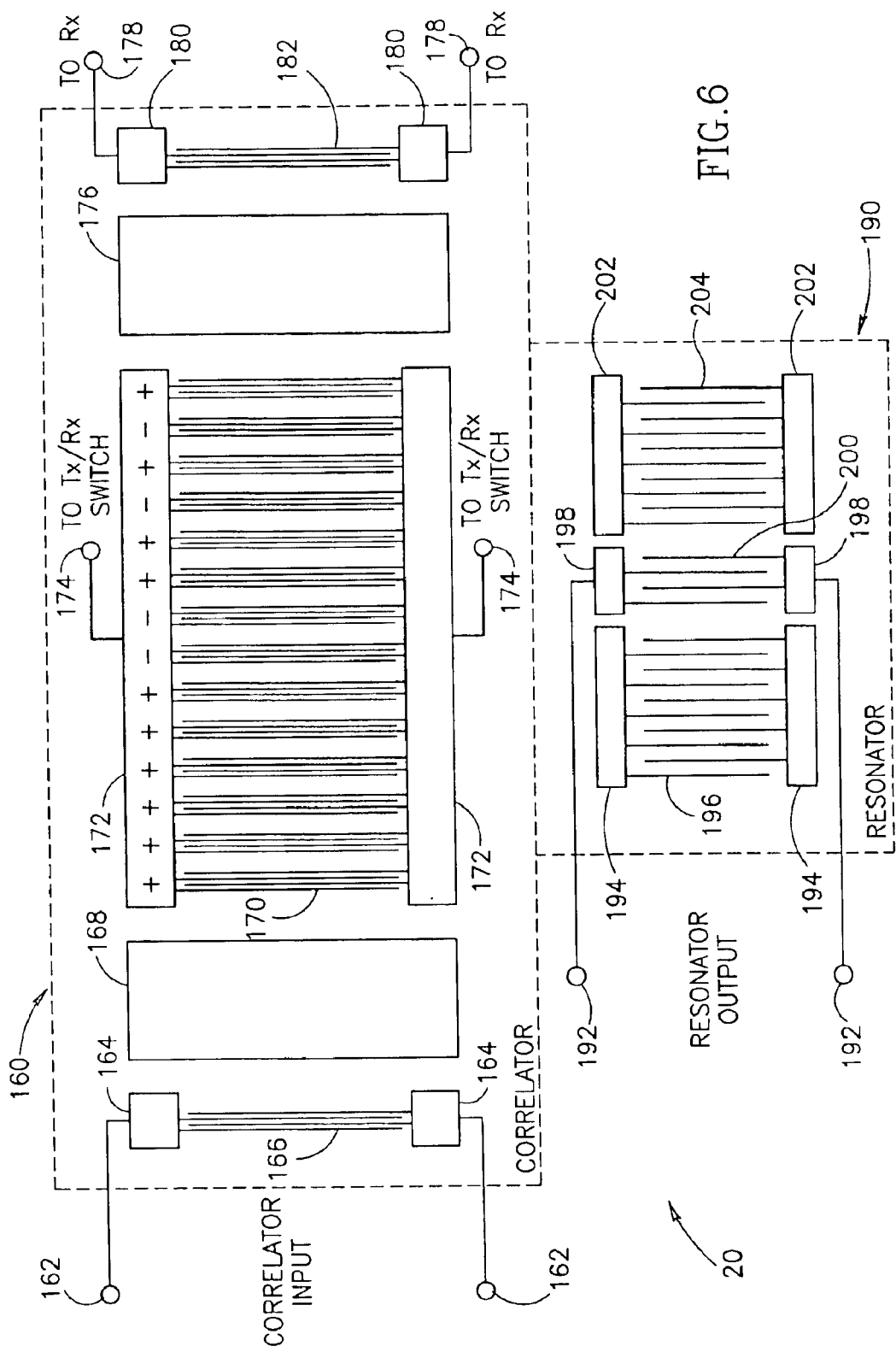
FIG. 6 is a pattern diagram illustrating the surface acoustic wave device including a SAW resonator and SAW correlator.

The SAW resonator and correlator devices of the present invention will now by described in more detail. A pattern diagram illustrating the surface acoustic wave device including a SAW resonator and SAW correlator is shown in FIG. 6. The SAW device 20 is constructed on a single piezoelectric substrate preferably made of quartz crystal, ST cut. The substrate may be constructed of materials other than quartz so long as the material used has acceptable temperature-stable properties. The SAW device 20 comprises two SAW components: a resonator 190 and a correlator 160. The correlator is a passive element which functions as a direct sequence spread spectrum spreading and de-spreading element. Both are described below in more detail beginning with the resonator. Note that the SAW resonator and correlator are adapted to fit onto a die size of approximately 1.5 mm².

The resonator 190, a two terminal device, is coupled to the oscillator circuit 42 (FIG. 2), and in more detail is shown coupled to the base of transistor 64 (FIG. 5). The resonator device 190 comprises input terminals 192 connected to signal electrodes 194, 198, 202. The signal electrodes 194, 198, 202 have comb shapes 196, 200, 204, respectively, for converting an electrical signal into surface acoustic waves. Note that the side electrodes 196, 204 span the entire distance unlike electrode 200. The two sets of signal electrodes, separated from each other by a predetermined distance, are operative to convert the surface acoustic waves into an electrical signal. Both signal electrodes are formed on the quartz crystal substrate using well known lithography techniques and are constructed of any suitable conductive material such as aluminum (Al), Gold (Au), Silver (Ag), copper (Cu) or the like having low electrical resistivity. Aluminum (Al) is preferable as it has the advantages of being low cost and etches easily.

The correlator 160 is a six terminal device adapted to function as a transversal 13-bit Barker code BPSK correlator (i.e. matched filter). In the first embodiment, the central frequency $f_c$ of the correlator is 915 MHz with an accuracy $\Delta f$ of ±0.1 MHz. The bit rate (i.e., chip rate) of the correlator is at least 20 Mbps. The input and output impedance of the correlator is adapted to be approximately 50 Ohm.

It is important to note that correlators having different codes, different rates, different frequencies of operation and using different modulations are known in the art and may be used with the RF modem of the present invention.

The correlator 160 comprises input terminals 162 connected to input signal electrodes 164. The input electrodes comprise interdigital transducers 166 having a comb shape that function to form an input transducer. A conductive surface 168 is placed in series with the input transducer and functions to absorb RF energy so as to help prevent RF energy leaking from the input to the output. Signal electrodes 172 are placed in series with the absorbing surface 168.

The output signal electrodes are connected to output terminals 174 that are coupled to the Tx/Rx switch. The output signal electrodes comprise interdigital transducers 170 having a comb shape for converting an electrical signal into surface acoustic waves thus forming an output transducer.

A conductive surface 176 is placed in series with the output transducer. The Rx transducer, in series with the conductive surface 176, comprises signal electrodes 180 and interdigital transducers 182.

In the transmit direction, the interrogating pulse enters the SAW device via the correlator input and is spread by the output transducer. The signal electrodes of the input and output interdigital transducers, separated from each other by a predetermined distance, are operative to convert the surface acoustic waves into an electrical signal. The resulting electrical spread pulse developed across the output terminal 174 is input to the transmit RF front end circuit via the Tx/Rx switch.

The signal electrodes and absorbing surfaces are formed on the quartz crystal substrate using well known lithography techniques and are constructed of any suitable conductive material such as aluminum (Al), Gold (Au), copper (Cu) or the like having low electrical resistivity. Aluminum (Al) is preferable as it has the advantages of being low cost and etches easily.

In the receive direction, the spread pulse received from the antenna is input to the center transducer via the Tx/Rx switch which now functions as an input transducer rather than an output transducer. The input transducer functions to de-spread the pulse whereby the resulting de-spread pulse is output from the Rx transducer 182 to the receive circuit.

All the transducers are formed on the piezoelectric substrate so as to function as a surface acoustic wave correlator or matched filter. The comb-like electrode pairs in the center transducer are formed to represent the Barker code sequence used as the spreading waveform during transmission and the de-spreading waveform during reception. The comb-like electrode pairs in the center transducer are formed at intervals corresponding to the chip rate. In the example RF modem presented herein, the correlator comprises 13 comb elements 170. Each comb element functions to either invert the phase or non invert it.

Figure 7:
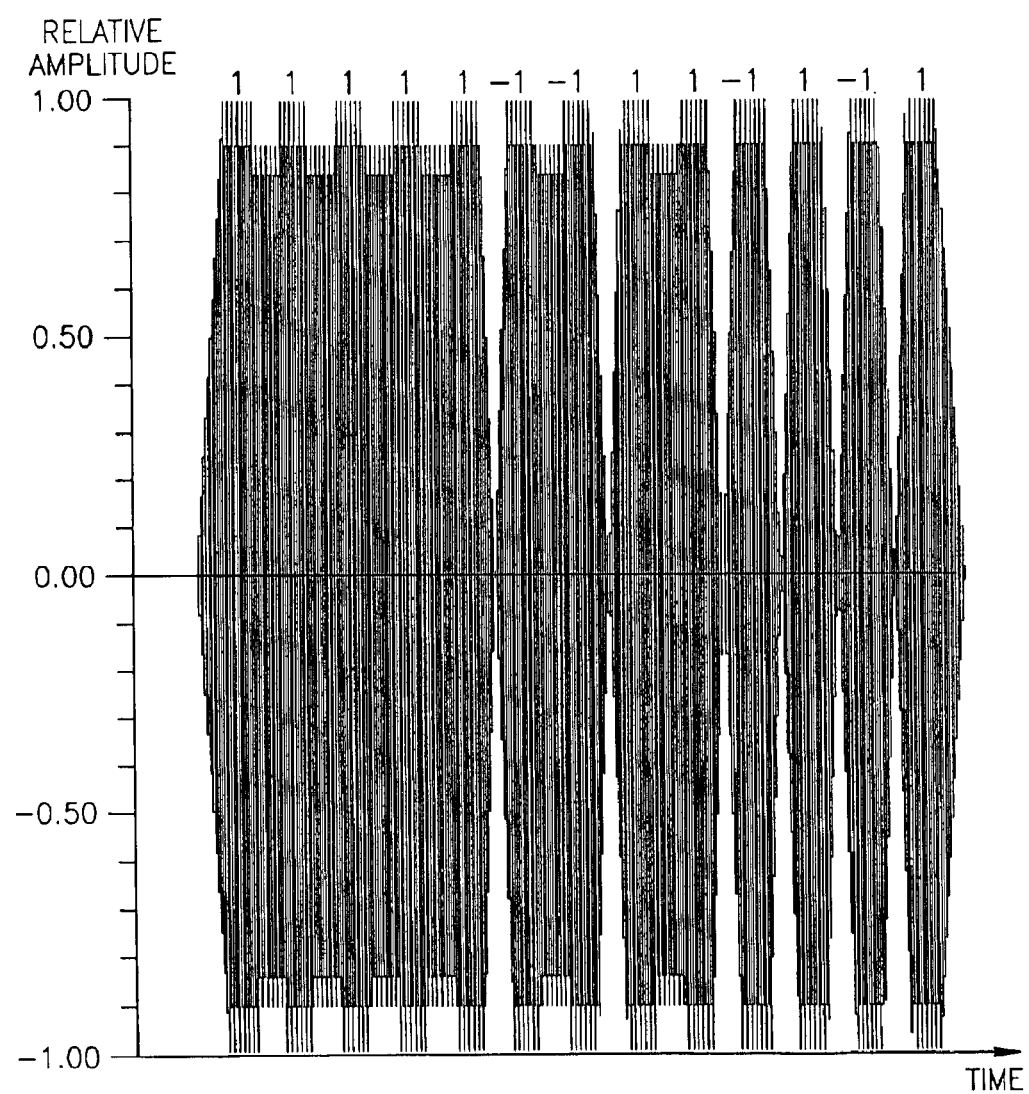
FIG. 7 is a plot illustrating the output impulse response of the SAW resonator device.

Note that the SAW correlator device of the present invention is a bidirectional device. The output of the correlator depends on the direction of signal flow. A plot illustrating the impulse response of the SAW resonator device is shown in FIG. 7. This plot illustrates the impulse response of the SAW correlator device that is generated in response to a delta function. The relative amplitude is plotted versus time. Along the top of the plot are indications (i.e., '+' or '−') of the phase inversion as performed in accordance with the 13 comb-like elements. A '+' indicates no phase inversion and a '−' indicates a 180 degree phase inversion. The 13 elements are configured to generate the 13 bit Barker code $\{+, +, +, +, +, -, -, +, +, -, +, -, +\}$ that is used in the RF modem. For example, a phase inversion occurs between the fifth and sixth comb element (i.e., + to −). Assuming a chip rate of 20 Mcps (i.e., 50 ns/chip), the 13 chip spreading code can be transmitted in 650 ns.

Each bit of the output transducer may be implemented using a plurality of cells. Each cell may be implemented with electrodes having alternating polarities $\{-1, 1\}$ as well as with combinations of isolated or shorted electrodes. The number of electrodes making up each bit may comprise 150 to 250. The operating center frequency $f_o$ of the correlator (e.g., 915 MHz) is determined by the period of the location of the electrodes and the alternation of their polarities. Note that if V is the effective velocity of the SAW, than the value $L = V/f_o$ is the resonant wavelength. The radiated SAW has a resonance for the discrete values of $S_e$ which is the number of electrodes displaced in one period L. The value of $S_e$ may be equal to 2, 3, 4, 3/2, 4/3, etc.

The 13-bit coded output pulse characteristics of the SAW correlator may be represented by $h_o(t)$. The desired H(t) can be calculated as a convolution of $h_1(t)$ and $h_2(i)$ [$h_1(t)*h_2(t)$] representing the impulse response of the output and input transducer, respectively. The transducers can be adapted such that $h_t(t)$ is similar to the 13-bit code [+, +, +, +, +, −, −, +, +, −, +, −, +] and $h_2(t)$ is a short uniform signal. The delay for $h_2(t)$ must be shorter than one bit of $h_1(t)$.

Spread Spectrum Code Sequence

The actual code used to configure the SAW correlator device 20 is important to the operation of the system. The spreading code sequence is preferably chosen, however, so as to maximize one or more desirable characteristics including, but not limited to, autocorrelation, noise immunity, transit spectrum and low intersymbol interface (ISI). In the United States, for transmission in the ISM band, the FCC requires that the code sequence comprise 10 or more chips and that the system exhibit a processing grain of greater than or equal to 10 dB. Therefore, the present invention utilizes a short code sequence that is close to the FCC minimum.

Although numerous different spread spectrum code sequences and other functions, such as linear FM, may be used with the present invention, the spread spectrum code selected is from the class of well known codes known as Barker codes. These codes are characterized as having good autocorrelation properties. The specific Barker code sequence used {1111100110101} exhibits good spectral flatness and low off correlation values. Note that the code sequence is 13 chips in length thus providing a margin of 3 chips over the FCC minimum.

Matched Filter/Correlator

Figure 8:
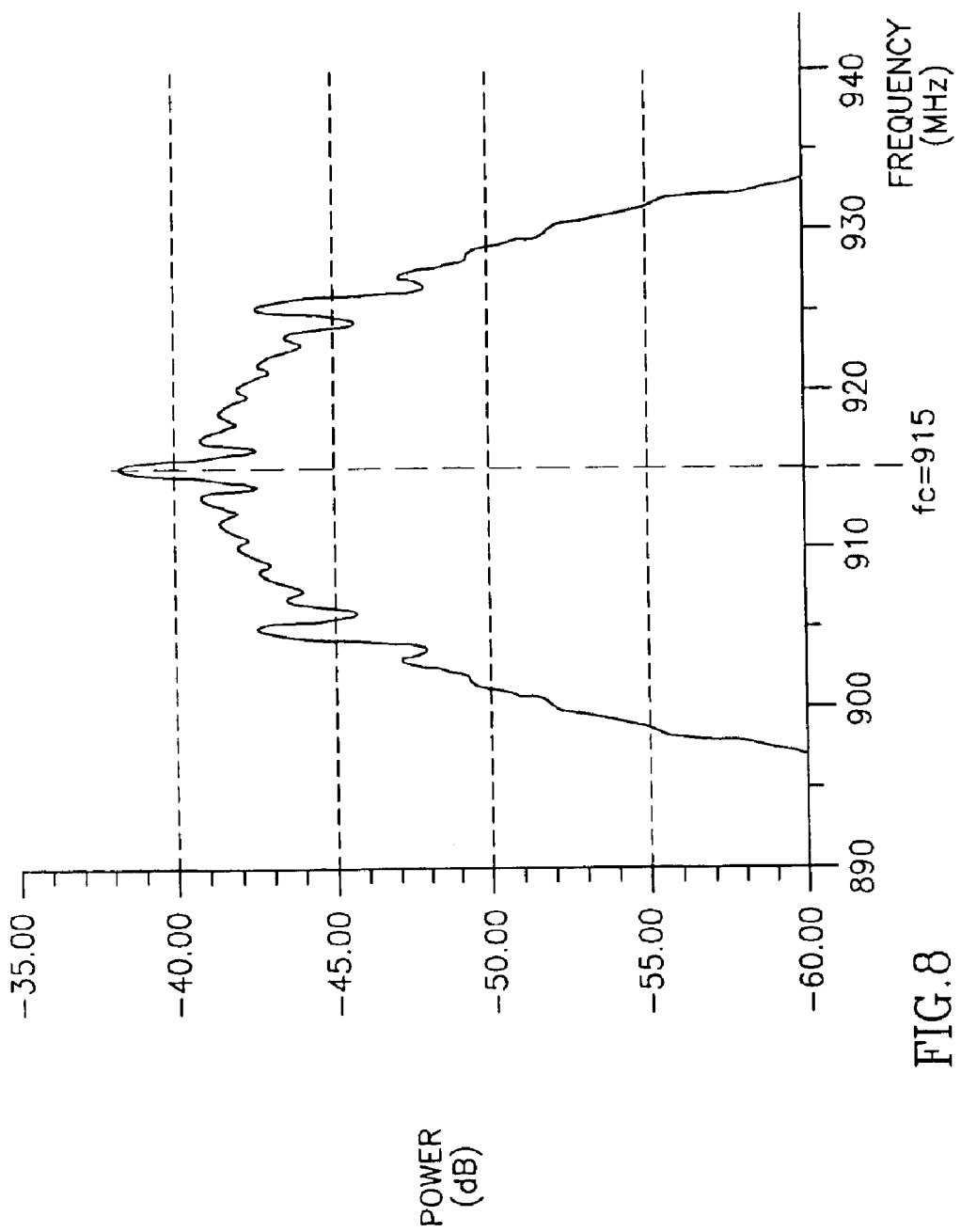
FIG. 8 is a plot illustrating the magnitude of the frequency response of the SAW device used in the RF modem.
Figure 9:
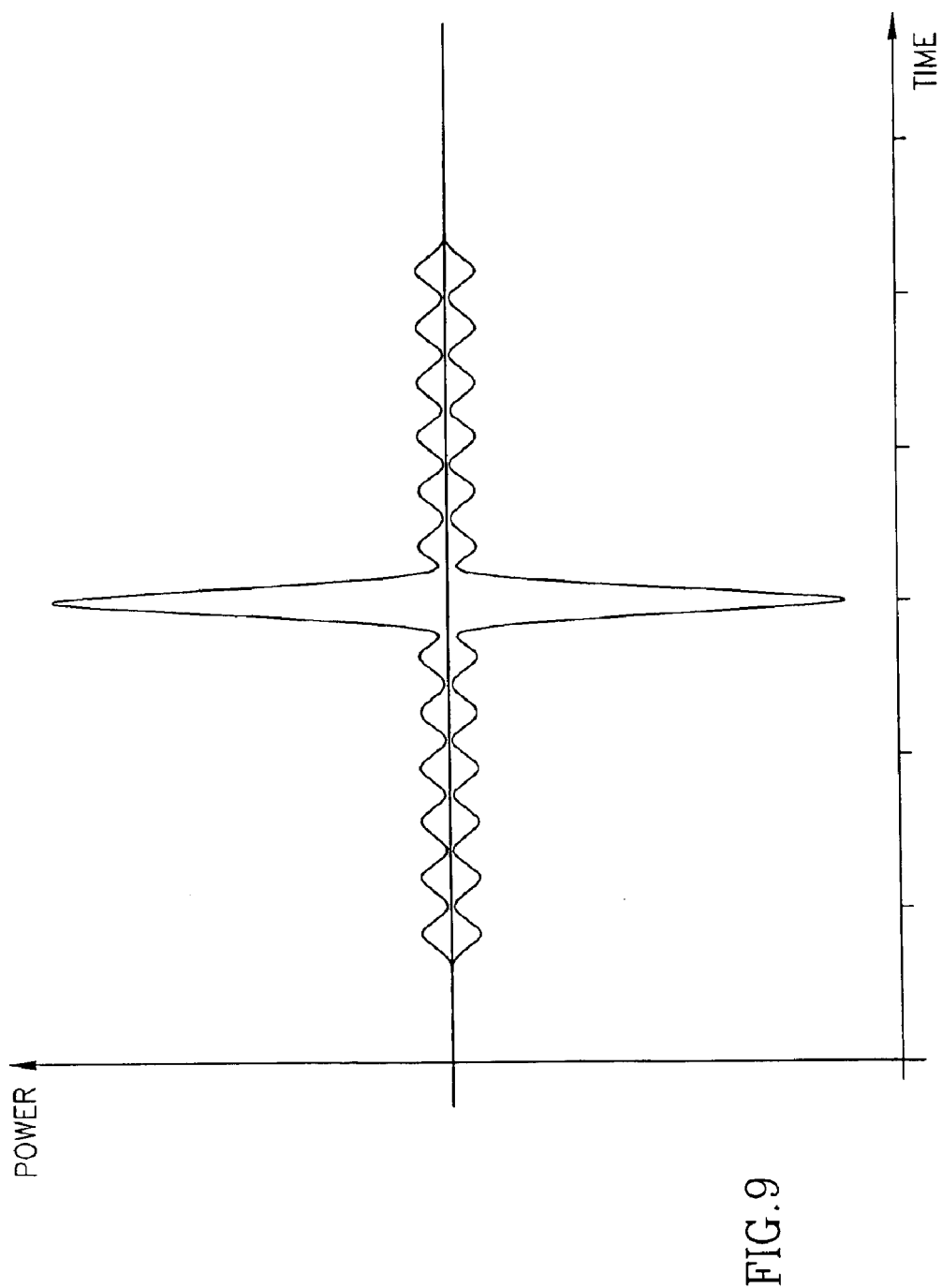
FIG. 9 is a plot illustrating the autocorrelation of the SAW correlator device.

The correlator coefficients are +1 for 1's and −1 for 0's whereby a 13 chip spreading code results in the following coefficients used in the construction of the SAW correlator; +1, +1, +1, +1, −1, −1, −1, +1, +1, −1, +1, −1, +1. A pilot illustrating the frequency response of the SAW device of the RF modem is shown in FIG. 8. The power in dB is plotted versus frequency. The frequency response is adapted to cover the ISM band (i.e., 902 to 928 MHz). The time representation of the frequency response, represented by h(f), is used to calculate the autocorrelation function a(t) whereby a(t)=h(t)*h(−1), a convolution of h(t) with h(−1). A plot illustrating the autocorrelation of the SAW correlator device is shown in FIG. 9. Each lobe of the autocorrelation is approximately 50 ns wide. The processing gain ratio is at least 11 dB=10*log10(13). Note that the 13 peaks or lobes (12 small peaks with one large peak in the center) correspond to the 13-bit Barker code configured in the correlator.

It is important to note that the present invention is not meant to be limited to the use of a BPSK SAW: correlator. In general any type of pulse compressor may be used in the modem. More particularly, the invention may be performed using any suitable spread spectrum SAW technique such as BPSK, linear FM and non-linear FM.

Figure 10:
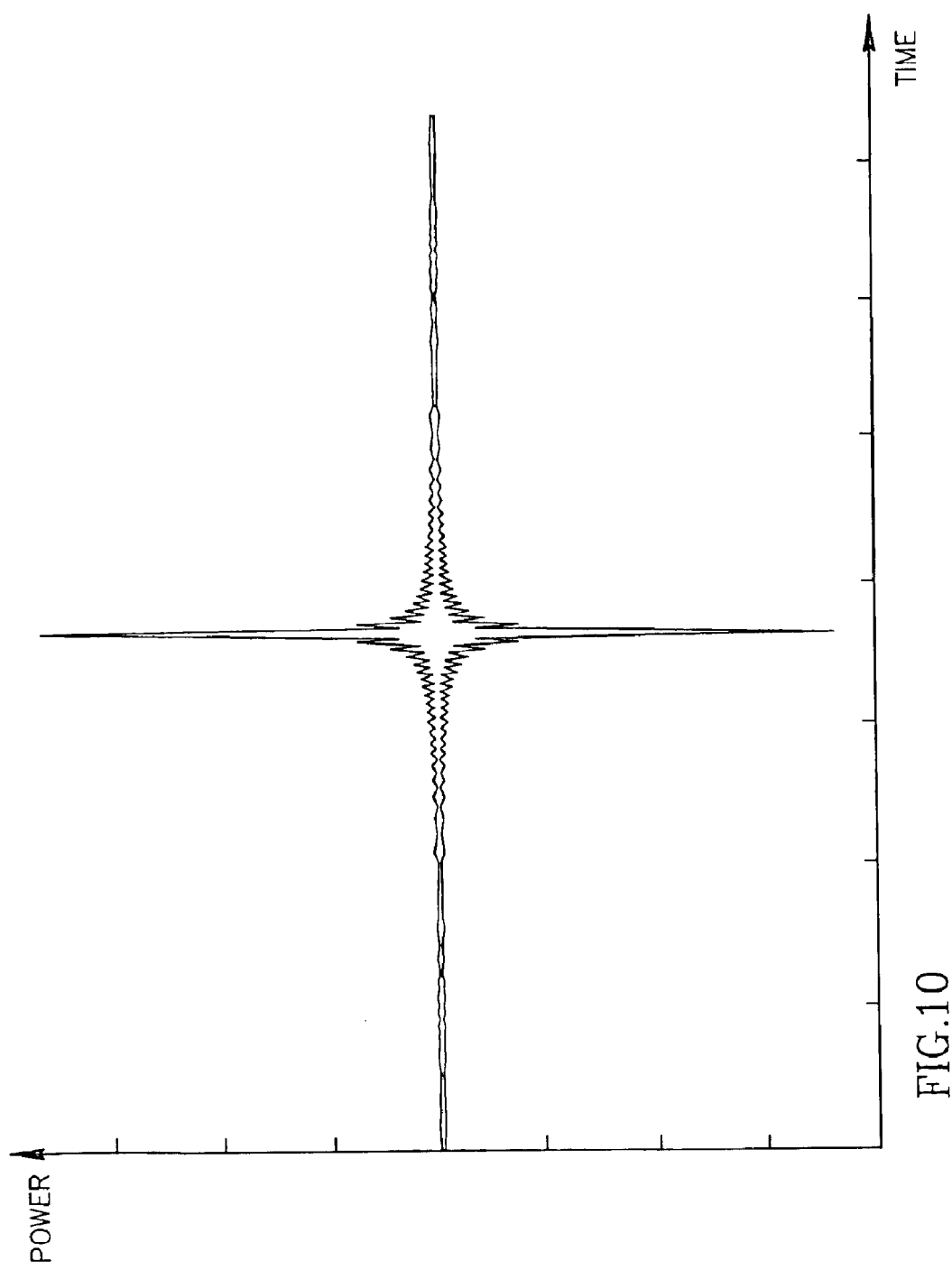
FIG. 10 is a plot illustrating the autocorrelation of a linear FM SAW correlator device.

In the case where the pulse compression used is linear FM, the signal can be expressed as follows in Equation 1.

$$V(t) = \sin[2\pi f(t) t] \quad (1)$$

where the frequency function f(t)=a·t is a linear rising function with time. A plot illustrating the autocorrelation of an example linear FM SAW correlator device is shown in FIG. 10. It is noted that the shape of the linear FM autocorrelation function differs from that of the BPSK autocorrelation function in that the envelope of the linear FM function falls off gradually.

In the case where the pulse compression used is linear FM, the signal can be expressed as in Equation 1 above where the frequency function $f(t)=a \cdot 1^2$ is a non-linear rising function with time. Note that other functions of frequency are also suitable as well.

Figure 11:
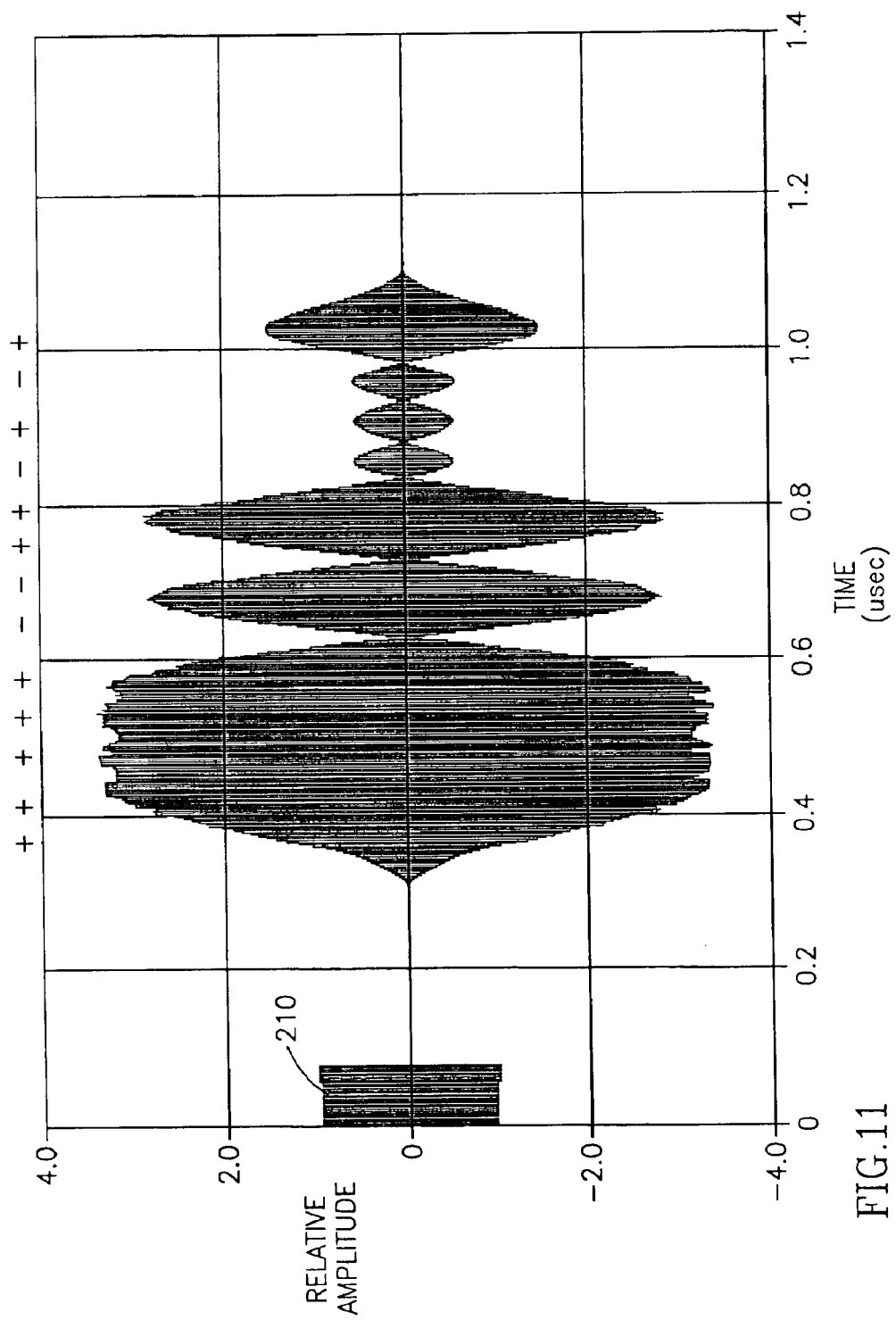
FIG. 11 is a plot illustrating the output of the SAW resonator device in response to an interrogating pulse.

A plot illustrating the output response of the SAW resonator device during transmission is shown in FIG. 11. This plot illustrates the output response of the SAW correlator device that is generated during transmission. The relative amplitude is plotted versus time. Along the top of the plot are indications (i.e., '+' or '−') of the phase inversion as performed in accordance with the 13 comb-like elements. A '+' indicates no phase inversion and a '−' indicates a 180 degree phase inversion. The 13 elements are configured to generate the 13 bit Barker code {+, +, +, +, +, +, −, −, +, +, −, +, −, +} that is used in the RF modem.

As can be seen, the spread pulse generated by the correlator comprises smooth transitions. As is known in the electrical arts, the interdigital transducers are constructed such that spectral sidebands of spread pulse generated are significantly reduced.

Subsequent to the generation of the spread pulse, the correlator generates an undesirable RF leakage pulse 210 caused by RF coupling within the SAW device. In accordance with the present invention, a pulse gating circuit is used to eliminate the RF leakage pulse from the output of the correlator. The pulse gate circuit comprises switching means (i.e. RF switches, FET switches, etc.) placed before and after the SAW correlator. The controller is adapted to operate the switches in an inverse manner whereby when the first switch is open, the second is closed, and vice versa. Thus, in operation, the control opens the first switch and closes the second switch to allow the interrogating pulse to enter the correlator while preventing the RF leakage pulse from being output. After a certain time period, the first switch is closed and the second is opened, thus allowing the spread pulse to be output to the transmit circuitry.

The output of the matching network 22 is input to a Tx/Rx switch 24 which is controlled by a Tx/Rx control signal generated by the host or other control/configuration means. When the switch 24 is in the Tx state, the output of the impedance matching network 24 is input to the transmit RF front end circuit 26.

Figure 12:
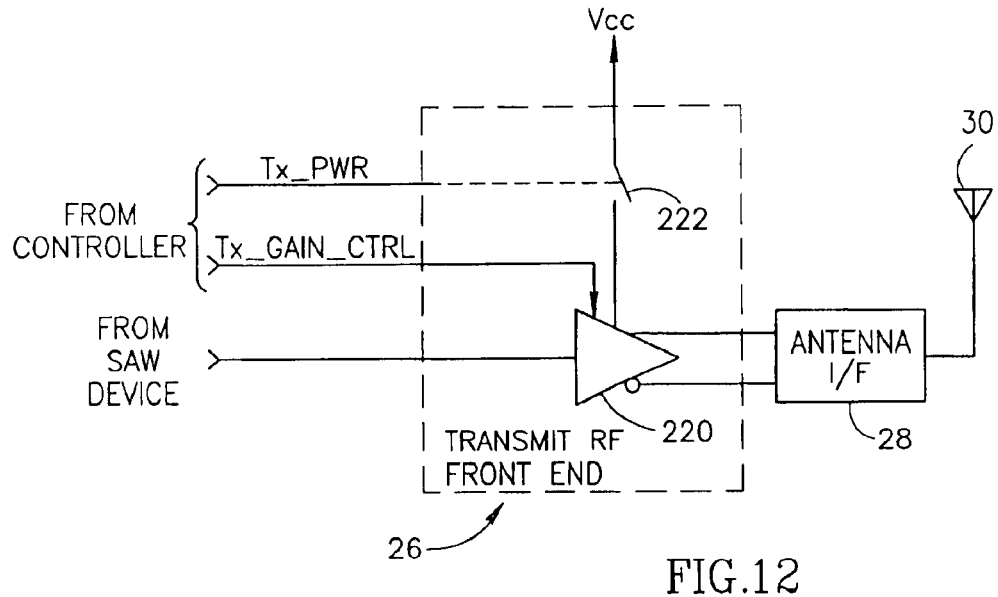
FIG. 12 is a block diagram illustrating the transmit RF front end circuit of the RF modem in more detail.

A block diagram illustrating the transmit RF front end circuit of the RF modem in more detail is shown in FIG. 12. The transmit RF front end circuit 26 provides the final stage of amplification and feeding to the antenna. The circuit comprises an RF power amplifier 220 having differential output. The $V_{CC}$ supply to the amplifier is controlled via switch 222 according to the Tx_PWR signal from the controller. In addition, the gain of the amplifier is set by the Tx_GAIN_CTRL signal also from the controller. The input to the amplifier is the spread pulse (i.e. the 13-bit BPSK sequence) output from the correlator at the RF frequency (e.g., 915 MHz).

The output amplifier 220 is operative to have a gain of approximately 40 dB. This level of gain is necessary in order to amplify the attenuated output of the SAW correlator, e.g., −30 to −20 dBm, to a level of approximately 15 dBm. The input impedance of the amplifier is preferably 50 Ohms. Note that in one embodiment, amplifying the signal twice, i.e., 10 dB using a first amplifier located before the SAW and 30 dB using a second amplifier located after the SAW, is preferable rather than using a single amplifier with larger gain. Due to the delay line effects of the SAW correlator 20, however, the two amplifiers are not turned on at the same time in order to avoid oscillations in the circuit. Note that amplifiers having switching times on the order of 10 to 20 ns are sufficient.

Note that in an alternative embodiment, the modem can be constructed to have two or more modes of operation, e.g., a high data rate, low range mode and a low data rate high range mode. In the high data rate mode, the gain of the amplifiers are set to low gain thus utilizing the high linearity of the amplifier. In the low data rate, the gain of the amplifiers are set high thus reducing the linearity but increasing the effective range. The two gain states are determined by the Tx_GAIN_CTRL signal from the controller.

In the low speed mode of operation, the correlator is interrogated with pulses that are spaced far enough apart such the pulses output from the correlator do not overlap each other. In other words, no Intersymbol Interface (ISI) is generated. As the interrogating pulses are spaced closer and closer together, the pulses output from the correlator begin to overlap each other thus creating ISI. Spacing the interrogating pulses closer together permits higher data rates to be achieved.

A SAW based spread spectrum transceiver can handle these higher bit rates due to the fact the SAW correlator is linear. A linear SAW correlator performs the same de-spreading process even for the higher bit rates so long as the amplifiers before the correlator remain linear. Thus, to achieve high bit rates by intentionally creating ISI requires that very linear amplifiers be used in the receiver front end circuit. Note, however, that when operating at higher bit rates, i.e., from 1 to 4 Mbps, the transceiver is more susceptible to interference and channel impairments.

The RF output of the power amplifier is input to an antenna interface 28 which functions to couple the antenna 30 to both the transmit and receive RF front end circuits. For example, the antenna interface may comprise any suitable RF switch. When in the Tx state, the switch is operative to couple the output of the amplifier to the antenna. The antenna may comprise any suitable configuration including but not limited to printed dipole with balanced feed, printed sleeve dipole without unbalanced feed, printed monopole with unbalanced feed, monopole helical with unbalanced feed, printed notch with unbalanced feed, printed spiral with unbalanced feed, printed semi-loop, printed patch shorted to ground by vias or small loop.

Figure 13:
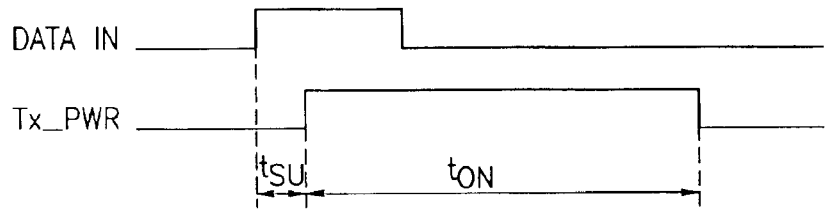
FIG. 13 is a diagram illustrating waveform traces of signals of the transmit RF front end circuit.

A diagram illustrating waveform traces of signals of the transmit RF front end circuit is shown in FIG. 13. The controller is operative to generate the timing and control signal required by the transmit circuit. The transmit control portion of the controller may be implemented as a state machine. In this case, the state machine is positive edge triggered thus starting a sequence of activating the amplifiers each time the data in signal line transitions from low to high.

The Tx_PWR signal is generated by the state machine in response to the data in line. A gating time delay of length $t_{SU}$ is imposed before the amplifiers are turned on. As described previously, pulse gating is used to prevent the RF leakage being output of the correlator. The amplifiers are maintained on for the duration of the spread pulse, i.e. approximately 800 ns.

Note that the functionality of the transmit state machine may be implemented using two one-shots in series. Both one-shots being retriggerable. The first one-shot having a duration equal to the pulse gating delay $t_{SU}$. The second one-shot having a time duration equal to the spread pulse width, approximately 800 ns.

Figure 14:
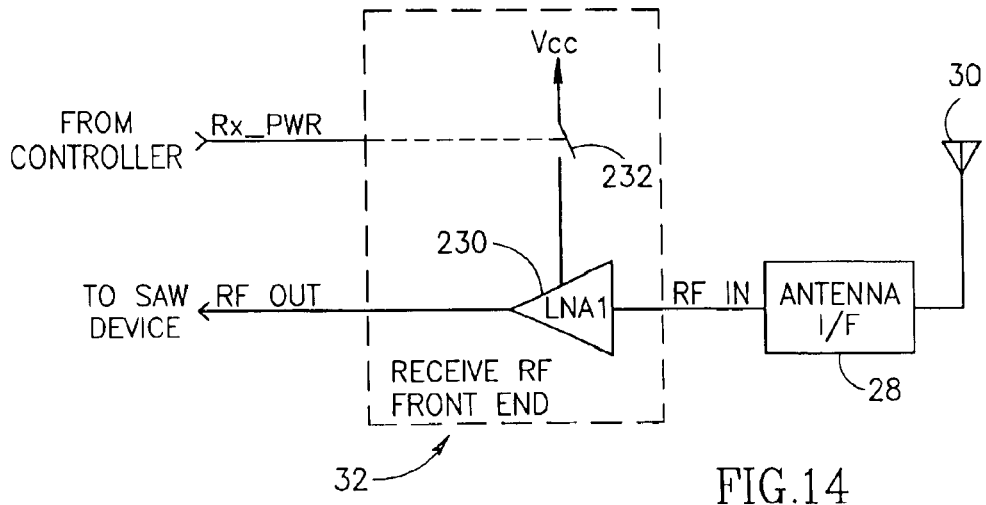
FIG. 14 is a block diagram illustrating the receive RF front end circuit of the RF modem in more detail.

A block diagram illustrating the receive RF front end circuit of the RF modem in more detail is shown in FIG. 14. In the receive path, the signal received from the antenna 30 is input to the receive RF front end circuit 32 via the antenna interface 28. The receive circuit comprises a low noise amplifier (LNA1) 230. The RF signal is then output to the SAW correlator. The $V_{CC}$ supply to the LNAs is controlled by switch 232 via the Rx_PWR signal from the controller.

Note that the receive circuit also may be constructed to have two modes of operation: a high bit rate, short range mode and a low bit rate, long range mode. The high bit rate mode assumes high carrier to noise ratio (CNR) and little channel multipath effects thus enabling high bit rate operation. The main concern in this mode is handling the effects of ISI. The low bit rate mode assumes low CNR and severe channel multipath and fading effects, thus requiring low bit rate operation. The main concern in this mode is handling weak receive signals and multipath effects.

Note that unlike typical prior art circuits, there is no need for a complex RF filter between the antenna and LNA1 other than a simple LC filter to allow for a wide dynamic range of transmitting and receiving signals. This requires the receive RF front end to have a very high dynamic range.

The output of the receiver front end is input to the SAW correlator which functions not only as a correlator but also as a sharp filter, rejecting out of band signals. Further, LNA1 preferably has high gain since the SAW device is a lossy component.

The signal output of the receiver RF front end circuit is input to the SAW correlator via matching network 22. The correlator functions to de-spread the received signal from the original code sequence to a relatively narrow pulse, e.g., from a wide pulse of 650 ns to a pulse width of approximately 50 ns.

Figure 15:
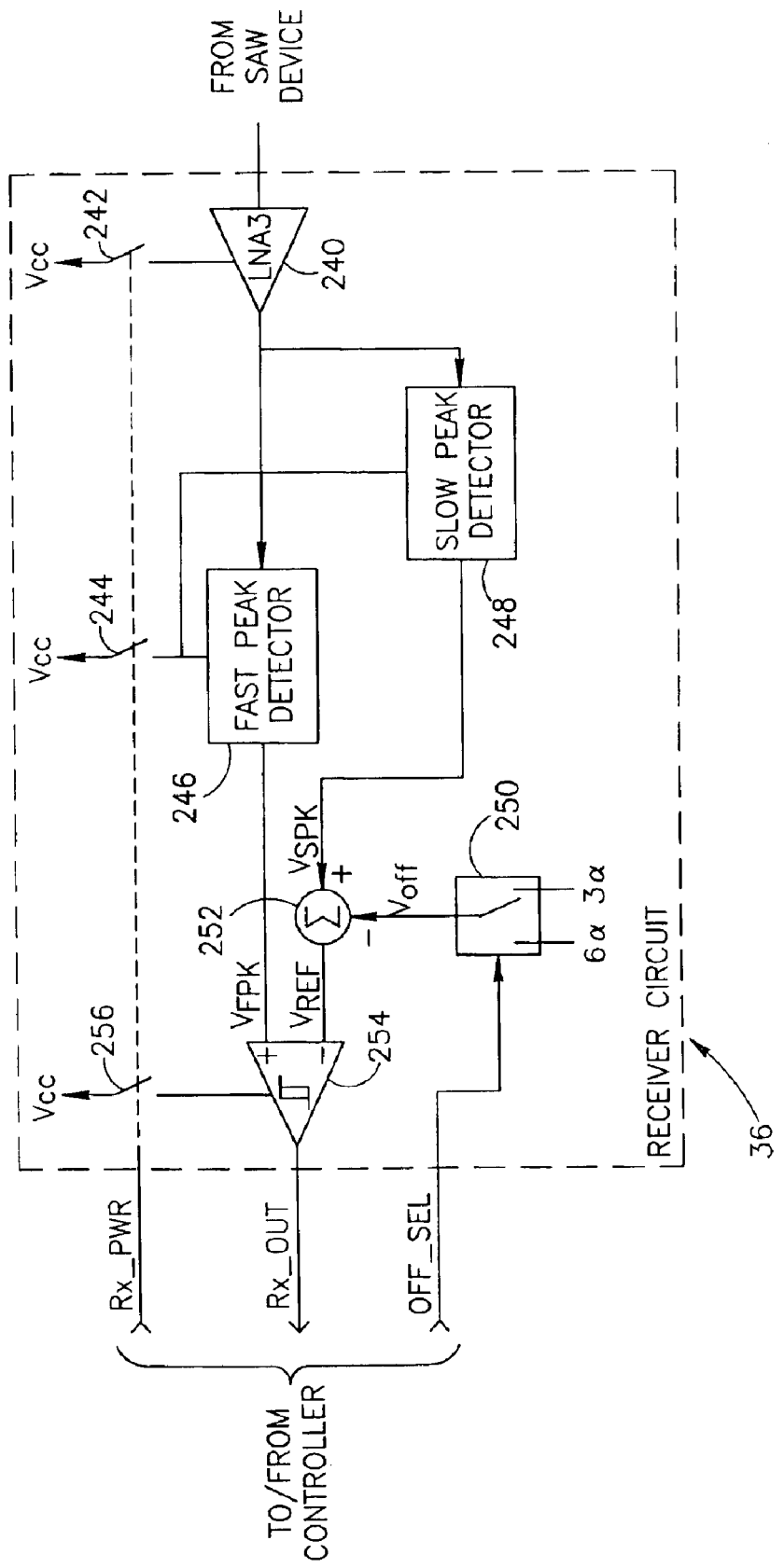
FIG. 15 is a block diagram illustrating the receiver circuit of the RF modem in more detail including the peak detector and decision circuits.

A block diagram illustrating the receiver circuit of the RF modem in more detail including the peak detector and decision circuits is shown in FIG. 15. The output of the SAW correlator is input to the receiver circuitry 36. The receiver circuitry comprises LNA 240 (LNA3), fast peak detector 246, slow peak detector 248 and decision circuit 254.

Note that LNA3 is optional, depending on the level of signal the peak detectors can detect with a reasonable level of noise immunity. The function of LNA3 is to compensate for the loses of the SAW correlator. The autocorrelation results from the SAW are input to LNA3. Note that in accordance with the present invention, the SAW device performs a dual role of integrating the energy of the received spread signal while filtering (i.e. rejecting) all other signals.

The output of the correlator is processed by the receiver circuit to determine whether a pulse is present or not. LNA3 preferably has high linearity and high dynamic range since the ASK modulation used is amplitude sensitive.

The peak detectors follow LNA3 and function to detect the envelope of the signal converting the RF signal to baseband. Preferably, the peak detectors are constructed to have a high dynamic range to match the input signal. In accordance with the invention, two peak detectors are used in parallel: a fast peak detector 246 and a slow peak detector 248. The difference between the two is their output bandwidth. The fast peak detector preferably has a bandwidth of 10 MHz (depending on the desired data rate) and the slow peak detector has a bandwidth that is set by a user via an external capacitor/resistor. In addition, a logarithmic peak detector is used in order to provide high dynamic range.

Both peak detectors are constructed using techniques well known to those skilled in the electrical arts. The fast peak detector functions to track the peak of the input signal using relatively little averaging. On the other hand, the slow peak detector is adapted to average the input signal so as to generate a slowly varying reference signal.

The decision stage is the final stage in the receive path. The output of this stage is a digital pulse that indicates whether a valid signal has been detected or not. It comprises a comparator 254 (e.g., Schmitt trigger comparator) whose output RX_OUT is input to the controller. The controller implements a state machine that functions to generate the data out line to the host.

The output of the fast peak detector circuit is input to the non-inverting input of the Schmitt trigger comparator 254 while the reference signal output of the slow peak detector circuit is input to the inverting input of the comparator. The output of the comparator forms the Rx Out signal which is input to the controller for processing and eventual output to the host for high layer processing, e.g., link or higher layer communications processing. The controller functions to make one or more decisions on the data in accordance with the desired modulation and communication scheme.

In accordance with the RF modem of the present invention, there is no requirement of a linear detector since all that is required is that the received pulse be detected. Thus, although a linear detector may be used, a non-linear detector enables the construction of a simpler, lower current consumption and less expensive peak detector. Depending on the application, the envelope of the received signal may be detected using either a linear or non-linear detector. The fast and slow detectors, in combination with the comparator, are operative to perform thresholding of the received signal and output digital binary data.

Note that the output of the comparator is a digital pulse that is processed by the host. The host can be configured (i.e., programmed) to implement numerous types of communication schemes, e.g., OOK, PWM, etc. Some examples of communication schemes are provided hereinbelow.

To provide two modes of operation, an offset voltage $V_{OFF}$ is subtracted from the output of the slow peak detector $V_{SPK}$. The signal $V_{SPK}$ is input to a summer 252 before being input to the inverting input of the comparator 254. The output of the fast peak detector $V_{FPK}$ is input to the non-inverting input of the comparator. An analog mux 250 selects which offset voltage to subtract from the slow peak detector voltage. For the high data rate mode, a threshold 3 dB below peak detection is used (i.e., $3\alpha$ offset) and for the low data rate mode, a threshold 6 dB below peak detection is used (i.e., $6\alpha$ offset), as expressed below in Equation 2.

{Mode 1}: $V_{REF}=V_{SPK}-3\alpha$

{Mode 2}: $V_{REF}=V_{SPK}-6\alpha$ (2)

The OFF_SEL signal from the controller determines which of the two modes the receiver operates in. In addition, the Rx_PWR signal from the controller controls the supply $V_{CC}$ to the INA3, fast and slow peak detectors and to the comparator via switches 256, 244, 242.

General, Transmit and Receive State Machines

As described previously, the controller functions to perform all the timing, control and digital processing of the RF modem. It may be implemented in any suitable manner including, for example, as a state machine. The inputs to the state machine include Data In, Mode, Tx/Rx, Shutdown and Clock. The outputs from the state machine include Data Out, Rx_PWR, Tx_PWR, OFF_SEL and Tx_GAIN_CTRL.

Figure 16:
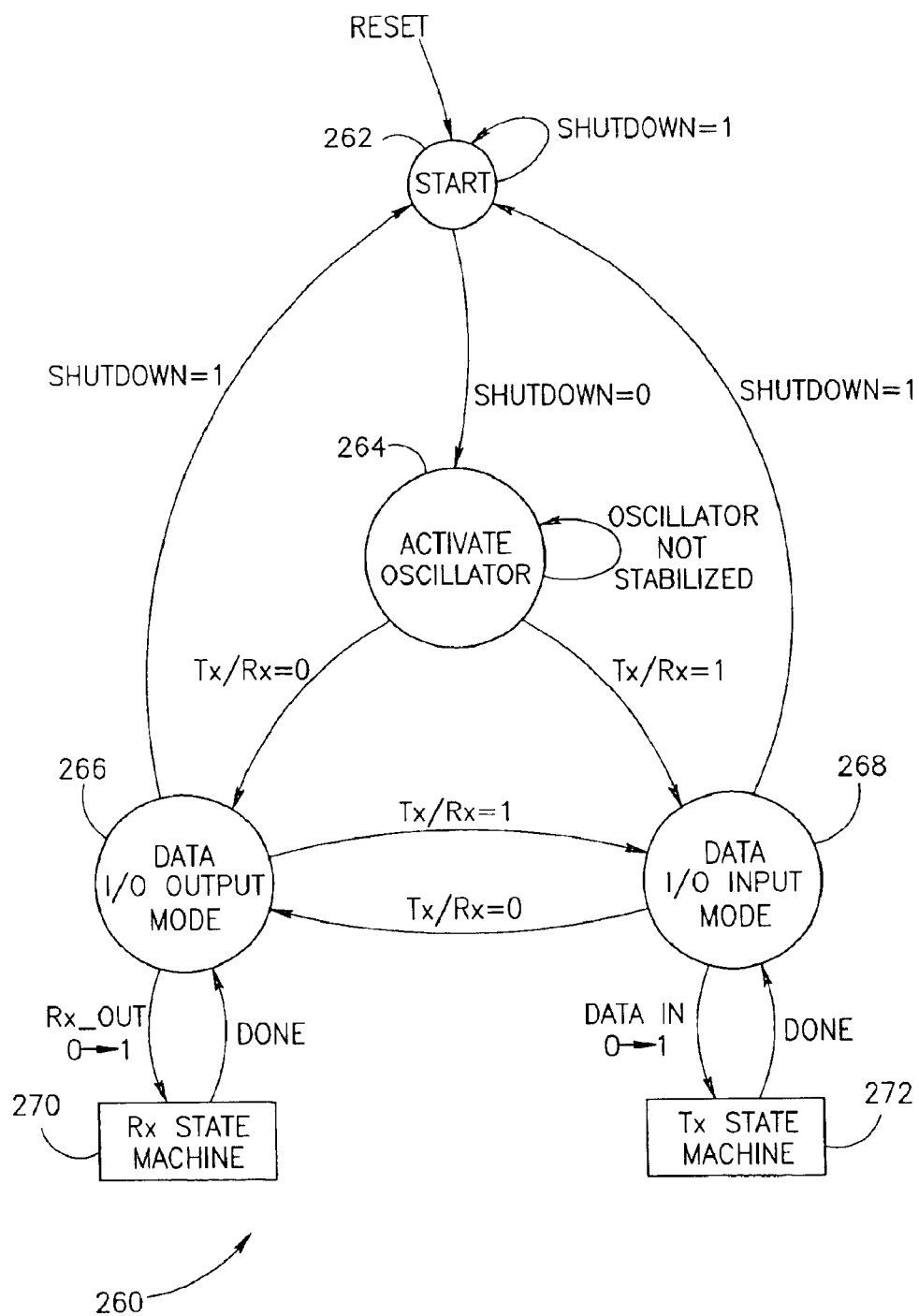
FIG. 16 is a state diagram illustrating the operation of the general state machine of the RF modem of the present invention.

A state diagram illustrating the operation of the general state machine of the RF modem of the present invention is shown in FIG. 16. The state machine, generally referenced 260, comprises the Start state 262 which is the initial state of the modem. This state is entered when the modem is powered (i.e. receiving $V_{CC}$) and Shutdown=1. In this state, the modem consumes very low current. Setting Shutdown=0 causes the modem to enter the Activate Oscillator state 264. Setting Shutdown=1 again from any state causes the modem to move to return to the Start state.

The Activate Oscillator state is the wake-up state wherein the oscillator is given 10 microseconds to stabilize. The next state depends on the state of the Tx/Rx input control line. When the Tx/Rx input control line goes high, the Data I/O Input Mode state 268 is entered. In transmit mode (Tx/Rx= 1) the SW_CONT, PULSE_OUT, Tx_PWR and Rx_PWR are all set to zero. When the Data In input line transitions from a low to a high (Data In=1), the Tx State Machine 272 is initiated.

Transitions between transmit and receive mode states 266, 268 are controlled by the state of the Tx/Rx line. Transitions from transmit and receive mode states to the start state is controlled by the Shutdown line.

Figure 17:
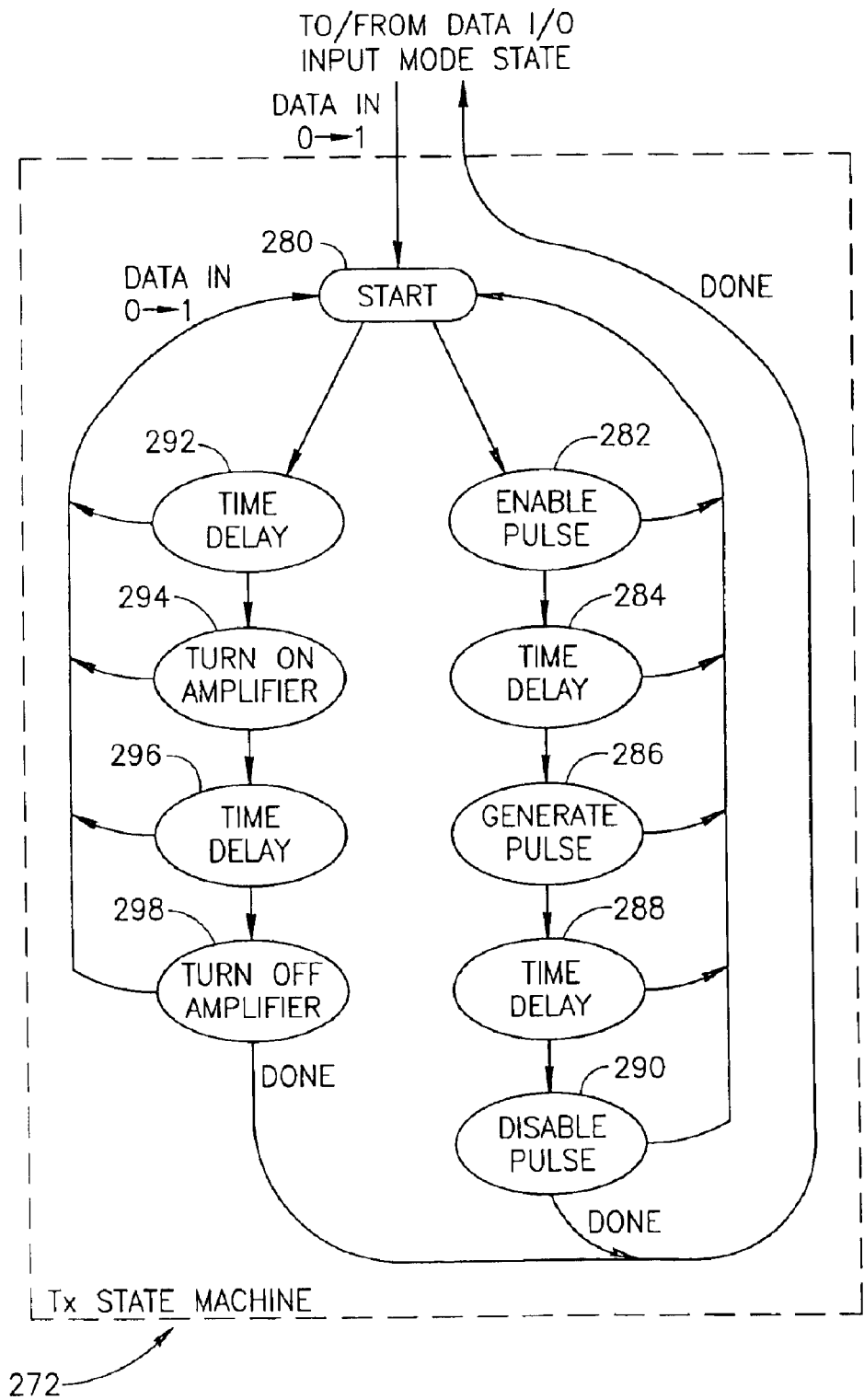
FIG. 17 is a state diagram illustrating the operation of the transmit state machine portion of the general state machine in more detail.

A state diagram illustrating the operation of the transmit state machine portion of the general state machine in more detail is shown in FIG. 17. Operation of the Tx state machine 272 begins with the Start state 280. From this state two operation paths are performed in parallel. One path generates the interrogating pulse and the other enables the transmitter RF front end circuit.

The interrogating pulse is generated first by entering the Enable Pulse state 282 wherein the SW_CONT signal is set high thus enabling the pulse shaping circuit 150 and the output amplifier 154 (FIG. 3). In the Time Delay state 284, a 50 to 150 ns time delay is then performed until stabilization is achieved. In the Generate Pulse state 286 state, the PULSE_OUT signal is set high which enables the interrogating pulse. The interrogating pulse is enabled for 56 cycles of the RF signal (i.e. approximately 115 ns) while in the Time Delay state 288. After the time delay, the signals are turned off in the Disable Pulse state 290. In particular, the PULSE_OUT signal is disabled (i.e. set low) and SW_CONT is set low.

Note that the generation of the interrogation pulse is non-retriggerable meaning that if a low to high transition of the Data In line occurs, it is ignored.

The amplifier is enabled by first entering the Time Delay state 292 which imposes a time delay before supply voltage is applied to the amplifiers in the transmit RF front end circuit, i.e. Tx_PWR is set high. The duration of the delay is approximately the delay of the SAW device minus the turn-on time of the power amplifier minus the duration of the interrogating pulse. In the next state 294, the amplifiers are turned on for a duration of approximately 800 ns (i.e. 390 cycles of the RF signal) imposed by the Time Delay state 296. In the next state 298, the amplifiers are shut off, i.e. Tx_PWR is set low.

Note that the circuitry that applies supply voltage to the transmit RF front end circuit is retriggerable meaning that if a low to high transition of the Data In line occurs, the 390 cycle time delay is restarted.

Referring to FIG. 16, when the Tx/Rx input control line goes low, the Data I/O Output Mode state 266 is entered. In receive mode (Tx/Rx=o) the SW_CONT, PULSE_OUT and Tx_PWR are all set to zero; Rx_PWR is set to one. When the output of the comparator in the decision circuit goes high (RX_OUT=1), the Rx State Machine 270 is initiated.

Figure 18:
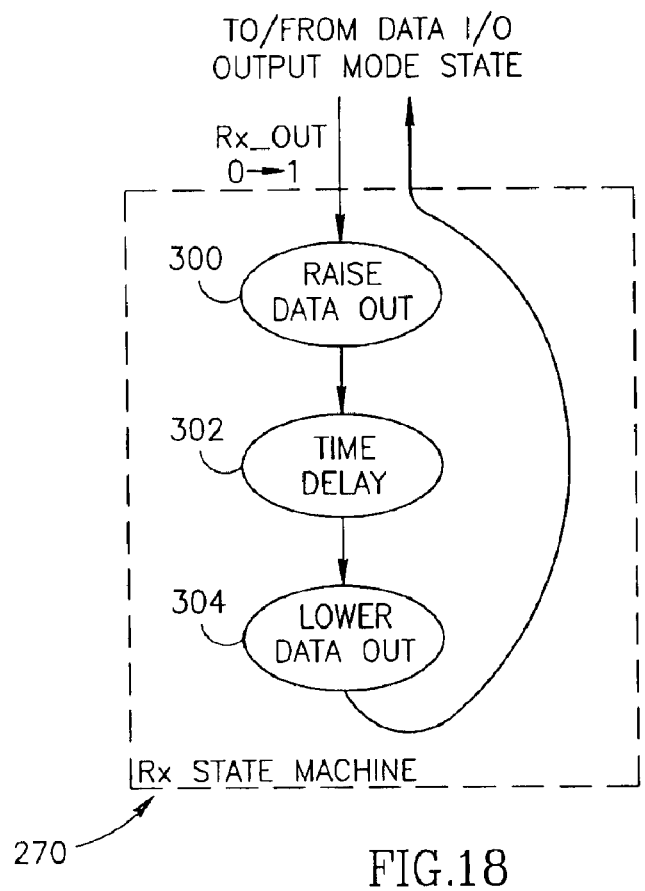
FIG. 18 is a state diagram illustrating the operation of the receive-state machine portion of the general state machine in more detail.

A state diagram illustrating the operation of the receive state machine portion of the general state machine in more detail is shown in FIG. 18. Upon a transition of the output of the comparator from low to high, the Data Out line is set (state 300). After a time delay of approximately 100 ns (state 302), the Data Out line is lowered (state 304) and control returned to state 266.

Second Embodiment RF Modem

In the second embodiment of the RF modem, an upconverter/downconverter functions to translate the spread pulse to/from a higher frequency. The majority of the circuitry of the modem does not change except for the signal generator 14, transmit RF front end 26 and receive RF front end circuits 32. The modifications necessary include the oscillator signal generation and the mixer circuitry required to perform the up/down conversion.

In the modem of the second embodiment, the signal generator 14 functions to generate an Intermediate Frequency (IF) and Local Oscillator (LO) signals used by the modem. In the example RF modem shown herein, the IF and LO are chosen to generate a transmit pulse in the 2.4 GHz ISM band, with an IF equal to 488 MHz and the LO equal to 1952 MHz. The sum frequency resulting in the desired RF equal to 2.4 GHz.

In the transmit direction, the output of the pulse generator is input to the transmit RF front end 26 via the Tx/Rx switch 24. The transmit RF front end amplifies and upconverts the pulse to the desired frequency band (e.g., 2.4 GHz). The resultant signal is amplified and output to the antenna 30 via the antenna interface 28.

In the receive direction, the signal from the antenna 30 is mixed down to IF before being input to the SAW correlator 20 via the Tx/Rx switch 24. The resultant de-spread signal is input to the receiver circuitry 36 which functions to recover the received data.

Figure 19:
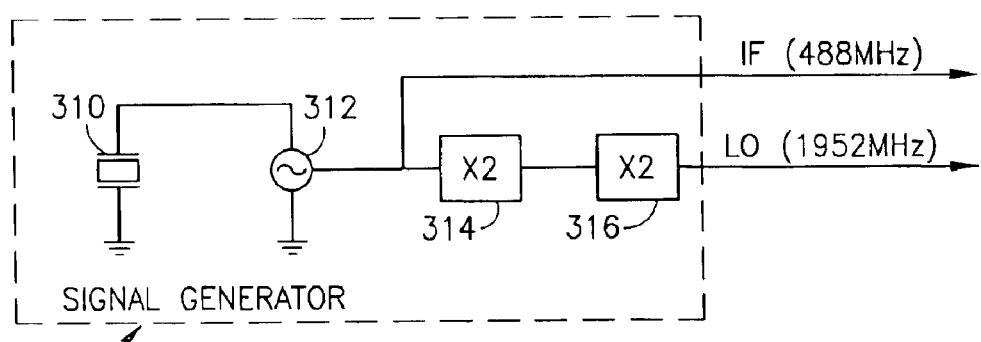
FIG. 19 is a block diagram illustrating the signal generator circuit of the second embodiment of the RF modem in more detail.

A block diagram illustrating the signal generator circuit of the second embodiment of the RF modem is shown in FIG. 19. The signal generator functions (1) to provide the basic clock for the state machine in the controller, (2) as a source for the generation of an interrogation pulse to the SAW correlator, and (3) as a source for the transmit and receive front end up/down conversion circuitry. A frequency source 310 is coupled to an oscillator circuit 312. The frequency source may comprise any suitable device such as a quartz crystal, ceramic resonator, SAW resonator, etc. A SAW resonator is used and implemented on the same substrate as the SAW correlator.

The output of the oscillator comprises the IF oscillator signal which is multiplied by four to generate the desired up conversion LO frequency (e.g., 1952 MHz). Note that the use of PLL circuits to perform the frequency multiplication may not be sufficient if fast wake up times are desired. In this case, it is preferable to utilize a quad self-mixing based components 314, 316. In addition, the circuit preferably suppresses sufficiently harmonics other then the LO frequency (e.g., 1952 MHz).

Figure 20:
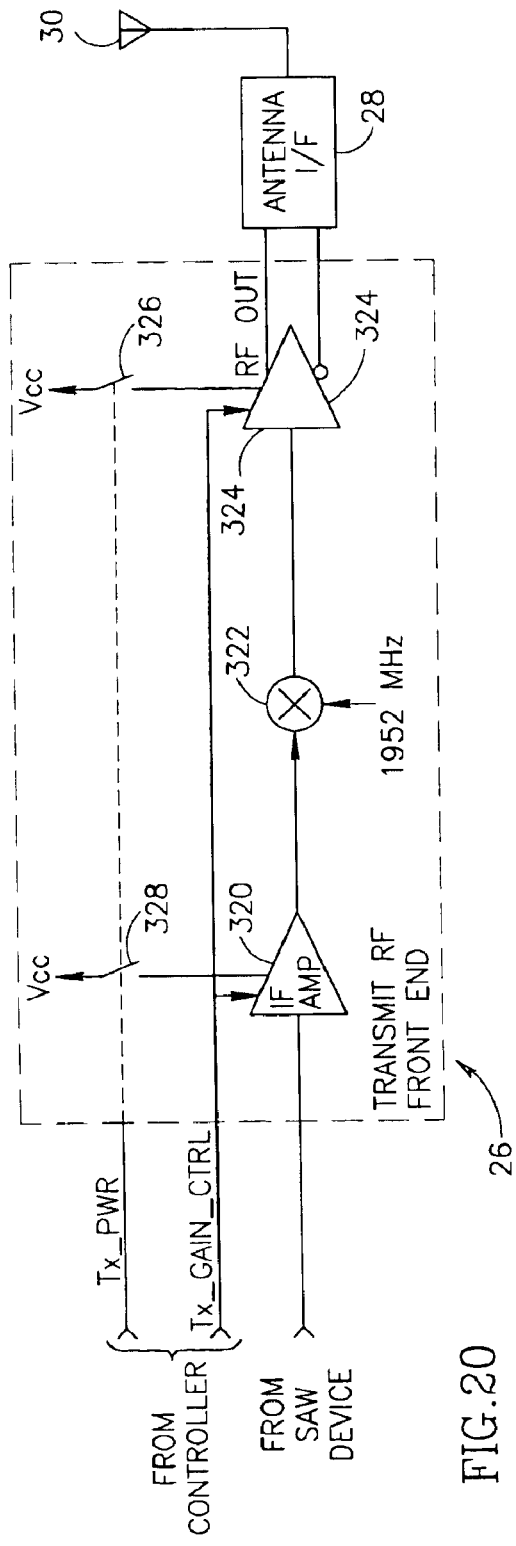
FIG. 20 is a block diagram illustrating the transmit RF front end circuit of the of the second embodiment of the RF modem in more detail.

A block diagram illustrating the transmit RF front end circuit of the second embodiment of the RF modem is shown in FIG. 20. The transmit RF front end circuit 26 provides the upconversion prior to the final stage of amplification and feeding to the antenna. The circuit comprises an a IF amplifier 320 having a non-differential input, mixer 322 and RF power amplifier 324 having differential output. The $V_{CC}$ supply to the amplifiers is controlled via switches 328, 326 according to the Tx_PWR signal from the controller. In addition, the gain: of the amplifiers is set by the Tx_GAIN_CTRL signal also from the controller.

The input to the IF amplifier is the spread pulse (i.e. the 13-bit BPSK sequence) output from the correlator at the IF frequency (e.g., 488 MHz). The mixer 322 upconverts the signal to the desired frequency band, such as 2.44 GHz using the LO signal of 1952 MHz. Preferably, an image rejection mixer is used having at least 30 dB rejection. The signals of the transmit RF front end circuit have waveforms as shown in FIG. 13.

Figure 21:
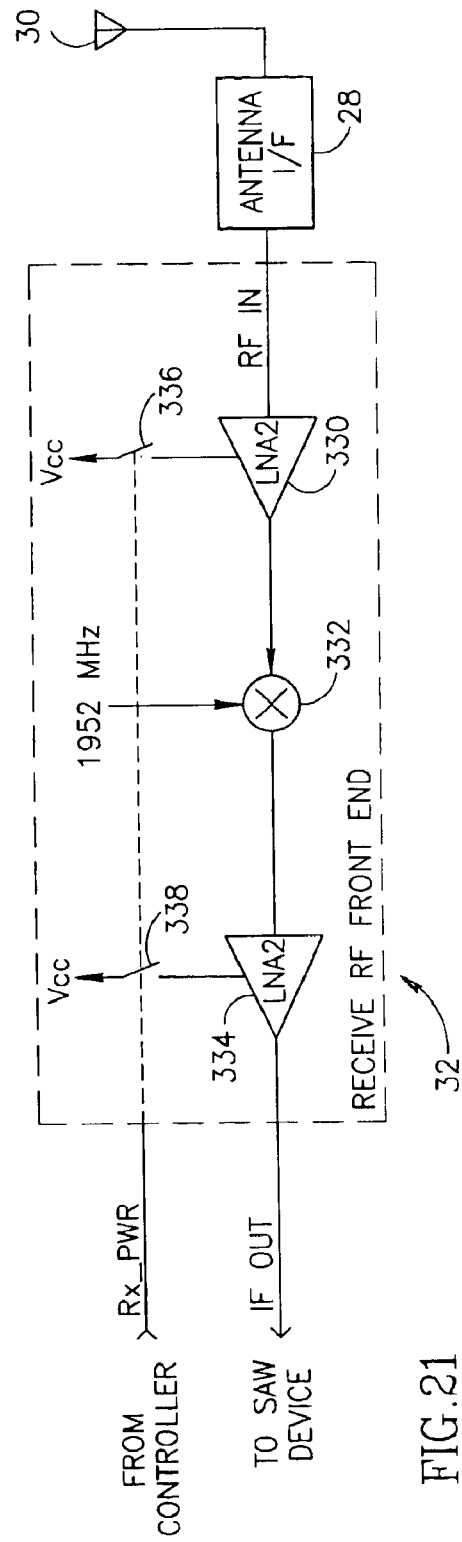
FIG. 21 is a block diagram illustrating the receive RF front end circuit of the of the second embodiment of the RF modem in more detail.

A block diagram illustrating the receive RF front end circuit of the RF modem in more detail is shown in FIG. 21. In the receive path, the signal received from the antenna 30 is input to the receive RF front end circuit 32 via the antenna interface 28. The receive circuit comprises a single stage down conversion. The RF from the antenna is input to a first low noise amplifier (LNA1) 330. The output is mixed with the LO signal of 1952 MHz via mixer 332 to generate the IF signal. The IF signal is then amplified by a second LNA 334 (LNA2) before being output to the SAW correlator. The $V_{CC}$ supply to the LNAs is controlled by switches 338, 336 via Rx_PWR signal from the controller.

Application of the Invention

As described previously, the RF modem is constructed generically as the basis for the physical layer for any number of modulation types and communication schemes. In particular, the RF modem is adapted to perform any type of digital pulse modulation. Three examples of digital pulse modulation will now be presented. The three modulation types include OOK, PWM and PPM modulations. Note that all of the following application examples may be constructed using any of the three RF modem embodiments described herein.

OOK Modulation

Figure 22:
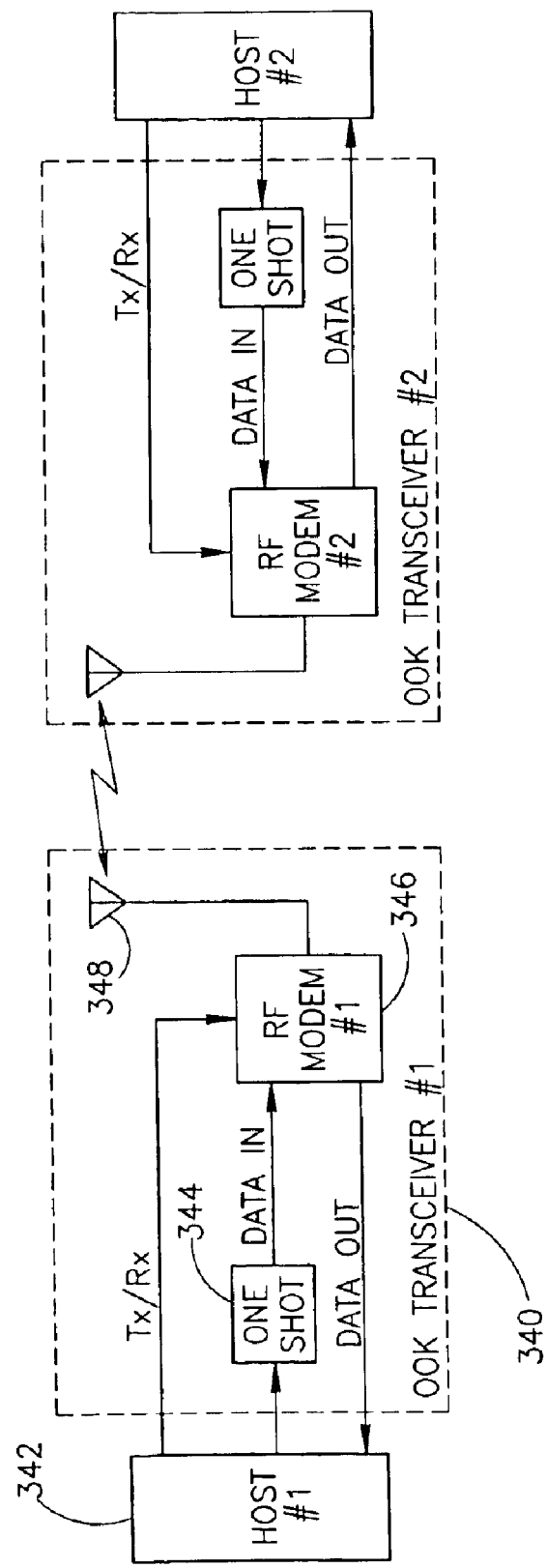
FIG. 22 is a block diagram illustrating an OOK communications system constructed using the RF modem of the present invention.

A block diagram illustrating an OOK communications system constructed using the RF modem of the present invention is shown in FIG. 22. The system comprises two OOK transceivers 340, labeled OOK transceiver #1 and #2 that are adapted to communicate half duplex using RF. OOK transceiver #1 comprises one shot 344, RF modem 346, labeled RF modem #1, and antenna 348. OOK transceiver #2 is similarly constructed and comprises a host #2, one shot device, RF modem #2 and an antenna. A first host 342, labeled host #1, is coupled to send data to and receive data from the OOK transceiver #1. A second host #2 is adapted to send data to and receive data from the OOK transceiver #2. Both hosts are adapted to drive the Tx/Rx control line to the modem.

In operation, the host transmits data by outputting the data to the RF modem #1. The data comprises a pulse to represent a '1', for example, and the absence of a pulse to represent a '0'. The RF modem is constructed in accordance with the present invention and is adapted to receive a pulse on the order of 50 ns. If the host cannot generate a pulse of such short width, a one shot device 344 can be used. The pulse is then spread, via the SAW correlator, to a spreading sequence as described above, and transmitted over the antenna 348.

The signal is received by the antenna of OOK transceiver #2 and input to the RF modem #2. The RF modem functions to de-spread the signal and output a 50 ns pulse to host #2 for further processing. If host #2 is not fast enough to input a 50 ns pulse, a second one shot or latch (not shown) can be used between the RF modem and the host.

PWM Modulation

Figure 23:
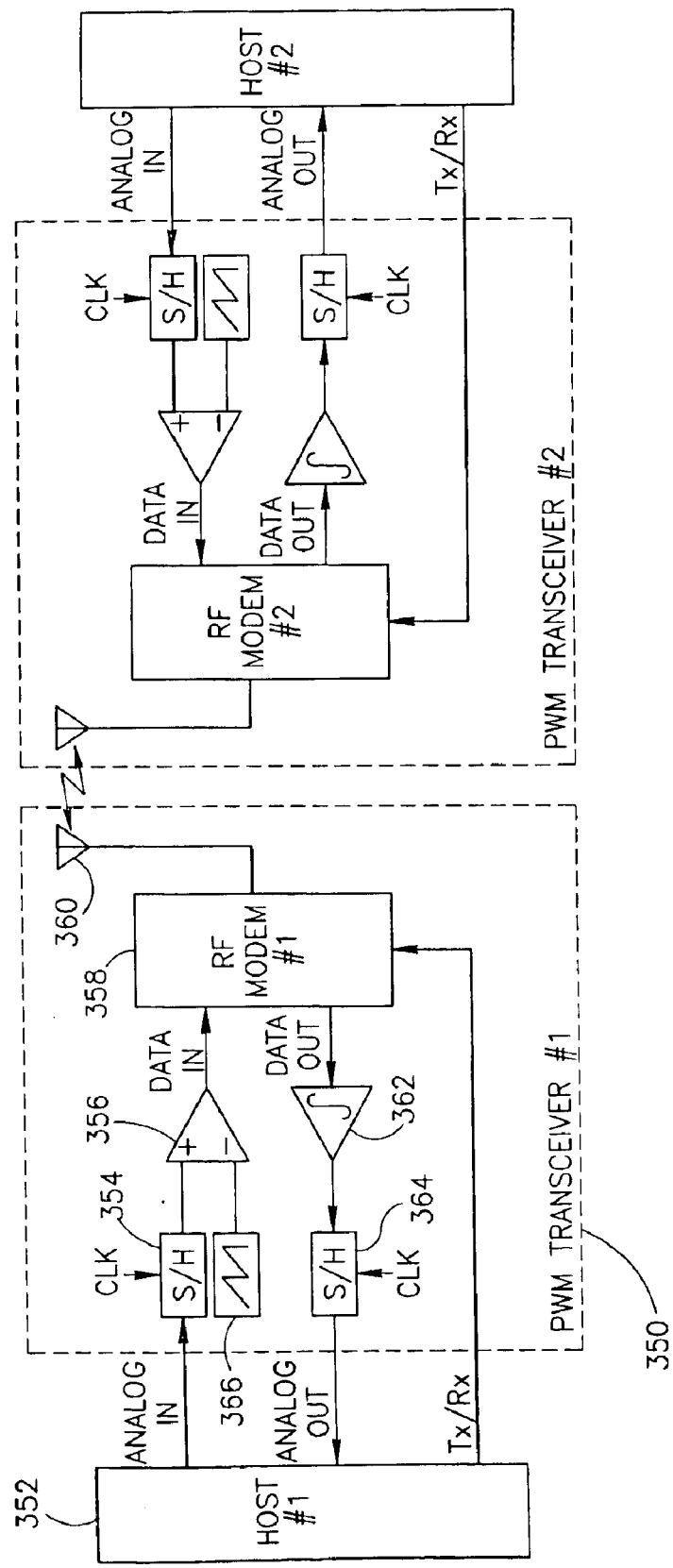
FIG. 23 is a block diagram illustrating a PWM communications system constructed using the RF modem of the present invention.

A block diagram illustrating a PWM communications system constructed using the RF modem of the present invention is shown in FIG. 23. The system comprises two PWM transceivers 350, labeled PWM transceiver #1 and #2 that are adapted to communicate half duplex using RF. PWM transceiver #1 comprises sample and hold (S/H) circuits 354, 364, saw tooth (ramp) signal generator 366, comparator 356, integrator 362, RF modem 358, labeled RF modem #1, and antenna 360. PWM transceiver #2 is similarly constructed and comprises S/H circuits, ramp function generator, comparator, RF modem #2, integrator and an antenna. A first host 352, labeled host #1, is coupled to send data to and receive data from the PWM transceiver #1. A second host #2 is adapted to send data to and receive data from the PWM transceiver #2. Both hosts are adapted to drive the Tx/Rx control line to the modem.

Figure 24:
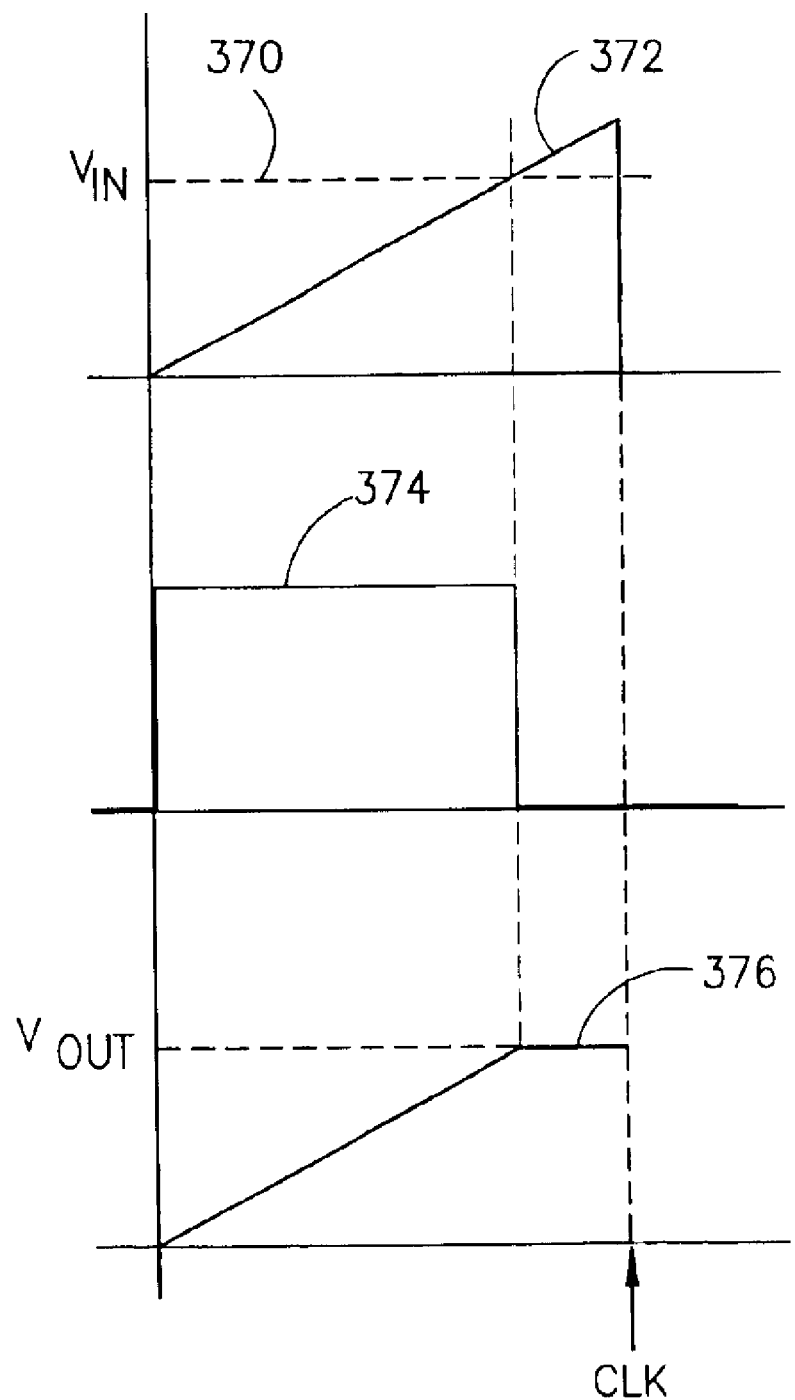
FIG. 24 is a diagram illustrating several signal waveforms of the PWM transceiver.

With reference to FIGS. 23 and 24, in operation, the host transmits data by outputting the signal Analog In to the S/H circuit 354. Note that the data may be either digital or analog and provided by means other than a host. In the example presented herein, the transceiver is adapted to transmit and receive analog signals but could be adapted by one skilled in the art to transmit and receive digital signals. The analog signal $V_{IN}$ 370 is sampled by the S/H circuit and input to the non-inverting input of comparator 356. The output 372 of the saw tooth or ramp function generator is input to the inverting input of the comparator. The period of the ramp function signal is preferably no wider than 150 ns to avoid problems associated with limitations of the Barker code. The output 374 of the comparator is high until the amplitude of the ramp exceeds the input signal at which point the output is brought low.

The Data In pulse is input to the RF modem and transmitted to PWM transceiver #2 via antenna 360. The pulse width of the transmit spreading waveform is varied in accordance with the pulse width of the input signal. For example, a 20 ns wide input pulse yields a receive signal whose peak pulse width is approximately 20 ns. A 100 ns wide input pulse yields a receive signal whose peak pulse width is approximately 100 ns. Note, however, that widening of the Barker code spreading sequence is limited. The increase in pulse width is limited to approximately 2 chips in duration (assuming a chip rate of 20 Mcps this corresponds to 150 ns).

The signal is received by the antenna of OOK transceiver #2 and input to the RF modem #2. The RF modem functions to de-spread the signal and output a pulse whose width is in accordance with the pulse width of the input signal. The output of the RF modem is input to an integrator 362 which functions to integrate the receive signal. The output signal $V_{OUT}$ 376 of the integrator is sampled by S/H 364. The output of the S/H circuit forms the Analog Out signal that is then input to the host or other means for further processing.

It is important to note that the ramp function generator and the clocks provided to the S/H circuits 354, 364 be synchronized such that a low to high transition of the ramp function corresponds with a symbol period of the data, i.e., Analog In signal, to be transmitted.

PPM Modulation

Figure 25:
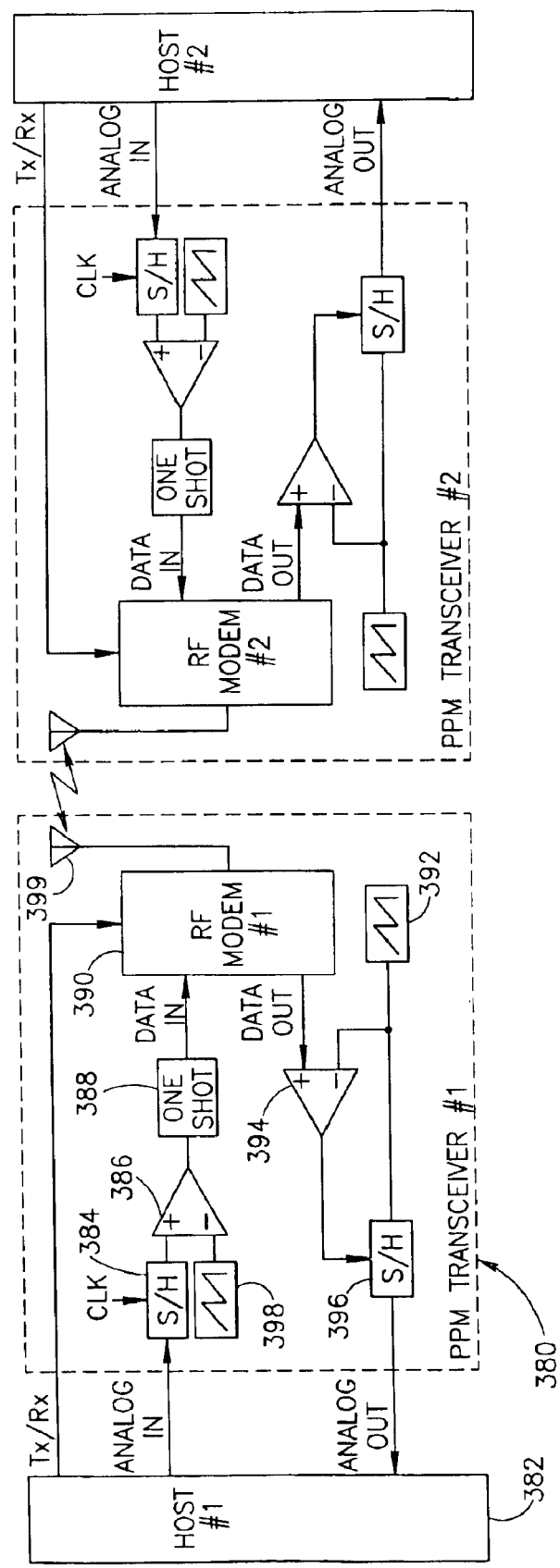
FIG. 25 is a block diagram illustrating a PPM communications system constructed using the RF modem of the present invention.

A block diagram illustrating an PPM communications system constructed using the RF modem of the present invention is shown in FIG. 25. The system comprises two PPM transceivers 380, labeled PPM transceiver #1 and #2 that are adapted to communicate half duplex using RF. PPM transceiver #1 comprises sample and hold (S/H) circuits 384, 396, saw tooth (ramp) signal generators 398, 392, comparators 386, 394, one shot 388, RF modem 390, labeled RF modem #1, and antenna 399. PPM transceiver #2 is similarly constructed and comprises S/H circuits, comparators, ramp function generators, one shot, RF modem #2 and an antenna. A first host 382, labeled host #1, is coupled to send data to and receive data from the PPM transceiver #1. A second host #2 is adapted to send data to and receive data from the PPM transceiver #2. Both hosts are adapted to drive the Tx/Rx control line to the modem.

Figure 26:
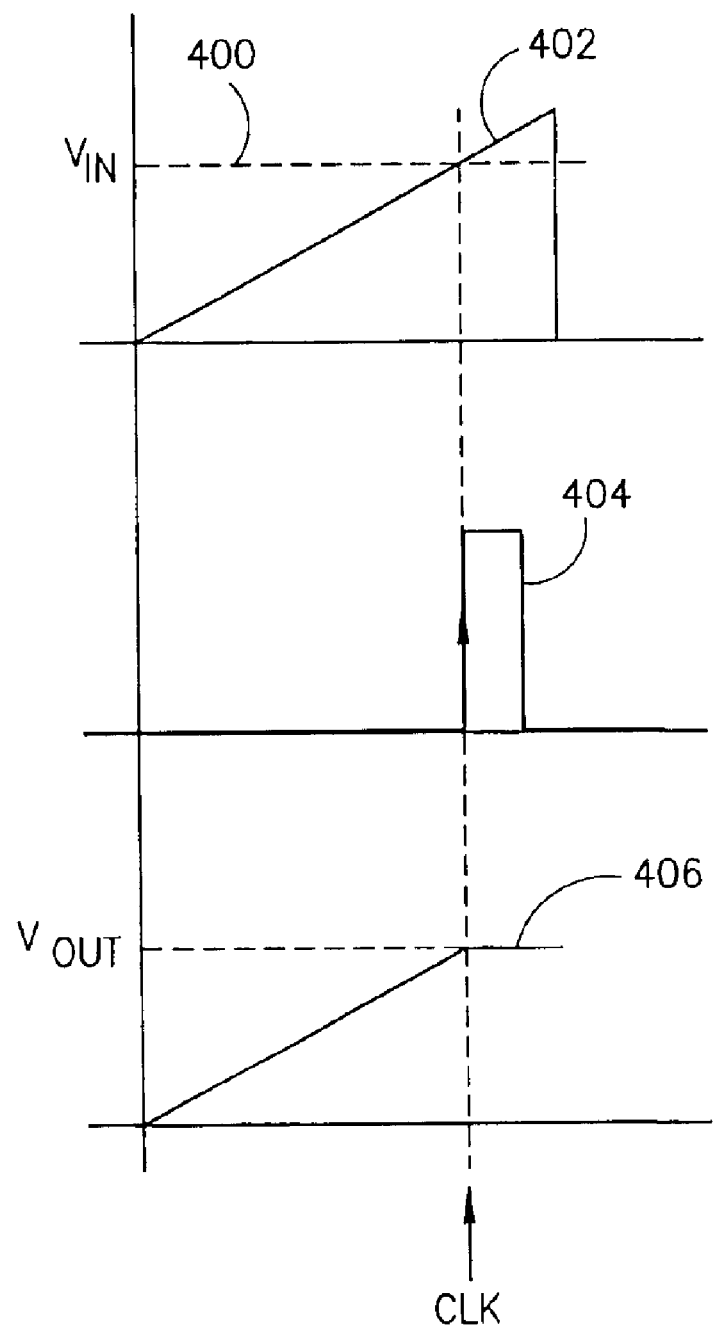
FIG. 26 is a diagram illustrating several signal waveforms of the PPM transceiver.

With reference to FIGS. 25 and 26, in operation, the host transmits data by outputting the signal Analog In to the S/H circuit 384. Note that the data may be either digital or analog and provided by means other than a host. In the example presented herein, the transceiver is adapted to transmit and receive analog signals but could be adapted by one skilled in the art to transmit and receive digital signals. The analog signal $V_{IN}$ 400 is sampled by the S/H circuit and input to the non-inverting input of comparator 386. The output 402 of the saw tooth or ramp function generator is input to the inverting input of the comparator. The output of the comparator is high until the amplitude of the ramp exceeds the input signal at which point the output is brought low. The output of the comparator is input to a one shot device 388 that is triggered by the falling edge of the output of the comparator. The one shot generates a pulse 404 uniform in width, e.g., 50 ns that is then input to the RF modem for transmission to PPM transceiver #2 via antenna 180.

The pulse position of the spreading waveform transmitted varies in accordance with the time position of the DATA IN signal. The signal is received by the antenna of OOK transceiver #2 and input to the RF modem #2. The RF modem functions to de-spread the signal and output, a pulse whose position varies in accordance with the pulse position of the input signal. The output of the RF modem is input to comparator 394. The second input is the output of ramp function generator 392.

In operation, the output of the ramp signal is sampled by the S/H circuit 396 until the pulse arrives and is output by the RF modem as the Data Out signal. The output of the comparator forms the clock signal to the S/H circuit. The input to the S/H 396 increases until the output of the RF modem exceeds the ramp signal. This corresponds to the RF modem outputting a pulse at a point in time corresponding to the receiving of the pulse from the transmitter. At this point, the S/H is clocked and the signal $V_{OUT}$ 406 output of the S/H is set equal to its input. The output of the S/H circuit forms the Analog Out signal that is then input to the host or other means for further processing.

It is important to note that the ramp function generator 392 and the clock provided to S/H circuit 384 be synchronized such that a low to high transition of the ramp function corresponds with a symbol period of the data, i.e., Analog In signal, to be transmitted. Synchronization schemes are known in the art for synchronizing the ramp signal with the received signal such that data can be received.

In a PPM communication system, the critical performance indicator is the ratio $\beta$ of symbol period to pulse width as given by Equation 3 below.

$$\beta = T/\tau \qquad (3)$$

The signal to noise ratio (SNR) is given by Equation 4 below.

$$SNR = \frac{\frac{\beta^2}{3} \cdot \frac{E_b}{N_o}}{1 + \frac{2}{3}\beta^2(\beta-1)\sqrt{\frac{E_b}{N_o\pi}} \; e^{-\frac{E_b}{4N_o}}} \quad (4)$$

wherein $E_b$ is the energy per bit and $N_o$ is the noise level. If it is assumed that the link budget has a fixed energy per bit $E_b$, the performance is therefore dictated by the value of $\beta$. As the pulse width narrows, the SNR increases and vice versa. For example, if the pulse width $\tau$ used in transmission is approximately 50 ns, the symbol period T is 1000 ns, resulting in a $\beta$ of 20, the $E_b$, equal to −70 dBm and the $N_o$ equal to −114+10*log(20)=−100 dBm, the SNR of the link is approximately 52 dB.

Third Embodiment RF Modem Using Multiple Correlators

To achieve higher communication bit rates, additional correlators and associated circuitry can be added to the first and second modem embodiments described above. In general, any number of correlators can be added wherein the correlator function or code of each correlator, represented by $f_i(t)$, is orthogonal with the functions of all other correlators. When the functions (i.e. codes) of each correlator are orthogonal to each other, each correlator transmits and receives independently of the other. A sufficient number of functions must be found, however, that satisfy the following criteria.

$$\langle f_i(t), f_j(t) \rangle = 0 \text{ for all } i \neq j \quad (5)$$

In other words, the cross correlation of all codes with each other must be very low, i.e. ~0. As an example, one skilled could easily generate multiple linear FM codes that are substantially orthogonal to each other and having cross correlations with each other of nearly zero.

To aid in understanding the principles of the present invention, an example modem is presented comprising N correlators. A modem can be constructed using any number N of correlators as long as the above-described criterion is met. The result of using multiple correlators is to increase the effective communication bit rate. Considering the RF modem of FIG. 1 having a bit rate of 1.5 Mbps as an example, the use of N correlators results in a total bit rate of N×1.5 Mbps.

Figure 27:
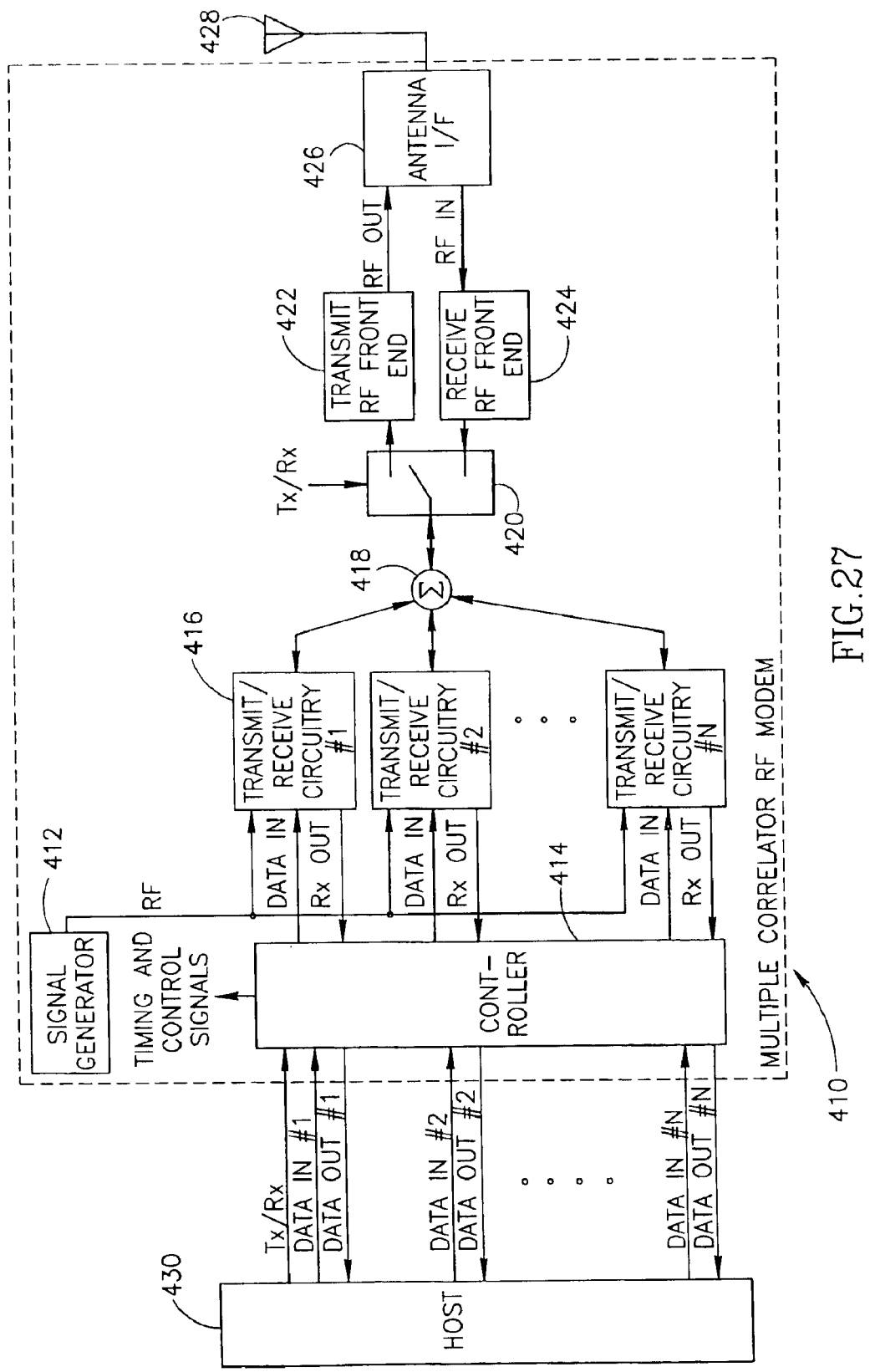
FIG. 27 is a block diagram illustrating a fourth embodiment of the RF modem of the present invention having more than one correlator.

A block diagram illustrating a third embodiment of an RF modem constructed in accordance with the present invention having multiple correlators is shown in FIG. 27. The modem, generally referenced 410, is constructed similarly to the first or second modem embodiments described above with the exception that there are now 'N' SAW correlators. The modem 410 comprises a single signal generator 412 that utilizes any suitable frequency source such as the SAW resonator of FIG. 6. The IF signal output of the signal generator 412 feeds a plurality of transmit/receive circuits 416, labeled transmit/receive circuit #1 through #N.

Each transmit/receive circuit receives a Data In line from a controller 414 and outputs an Rx Out signal thereto. A host 430 provides the data to be transmitted to the controller and to each transmit/receive circuit on separate Data In signal lines, labeled Data In #1 through Data In #N. Similarly, the output data from the controller for each transmit/receive circuit is input to the host via separate Data Out signal lines, labeled Data Out #1 through Data Out #N. The host also provides the Tx/Rx signal to the controller which functions to generate the timing and control signals required by the modem.

A signal line from each transmit/receive circuit is connected to an RF power/splitter combiner 418. The device functions as a combiner in the transmit direction and as a splitter in the receive direction. The power splitter/combiner is coupled to a Tx/Rx switch 420 that functions to divide the signal into transmit and receive paths. During transmission, the switch is configured to input the signal from the transmit/receive circuits to the transmit RF front end circuit 422. During reception, the switch is configured to steer the output of the receive RF front end circuit 424 to the transmit/receive circuits. The RF Out signal from the transmit front end circuit 422 and the RF In signal to the receive front end circuit 424 are coupled to the antenna 428 via an antenna interface 426.

Figure 28:
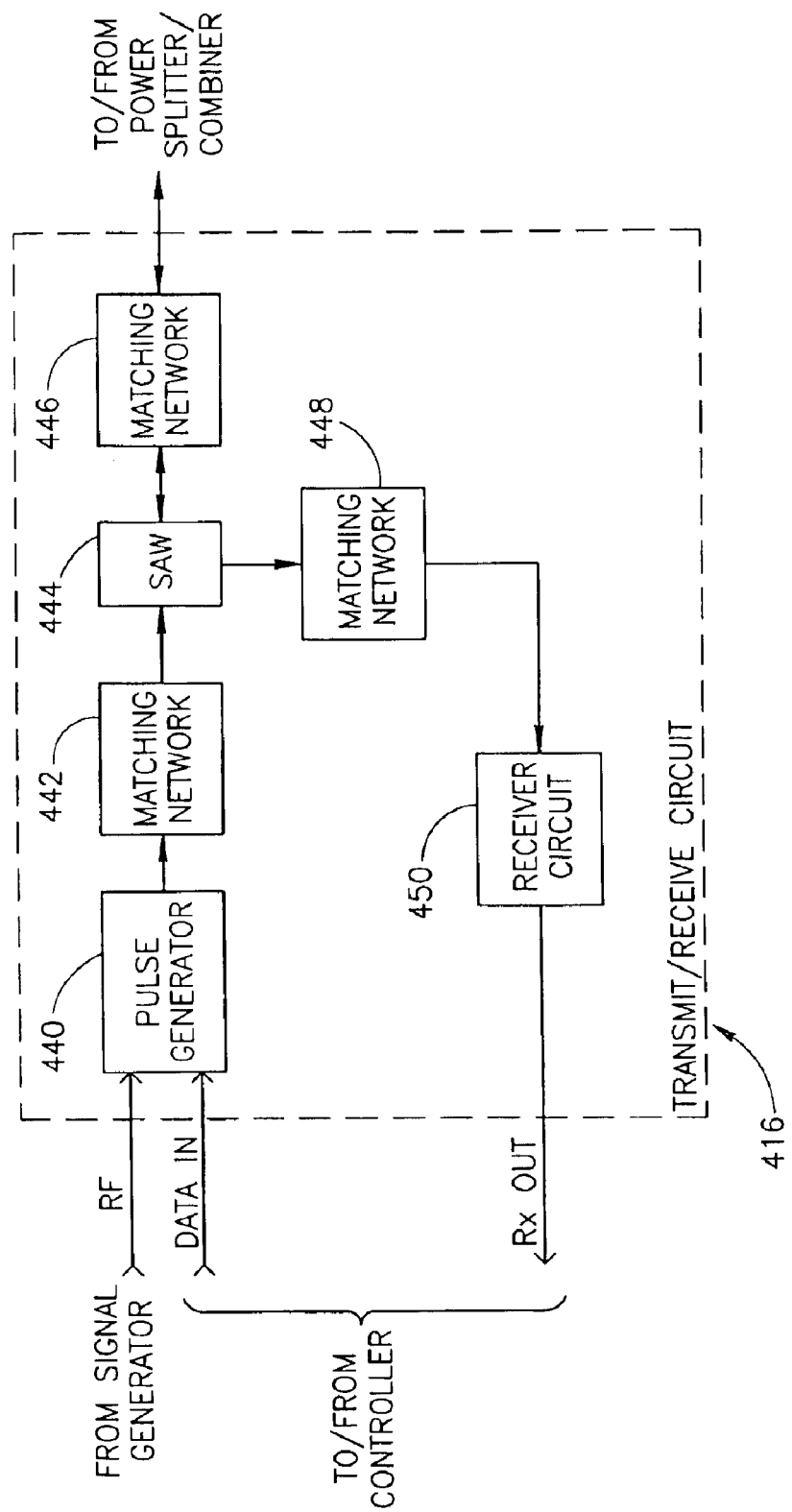
FIG. 28 is a block diagram illustrating the transmit/receive circuit of the RF modem of FIG. 27 in more detail.

A block diagram illustrating the transmit/receive circuit of the RF modem of FIG. 27 in more detail is shown in FIG. 28. The transmit path comprises a pulse generator 440 adapted to receive the IF oscillator signal from the signal generate and the Data In signal from the controller, matching network 442, SAW correlator 444 and matching network 446. The output of the matching network 446 is input to the power splitter/combiner 418 (FIG. 27).

The receive path comprises matching network 446, SAW correlator 444, matching network 448 and receiver circuit 450. The output of the receive circuit 450 forms the Rx Out signal subsequently input to the controller 414.

Note that the components of the modem 410 including the transmit/receive circuit 416 function similarly as like components of the first and second embodiments of the modem described above. During transmitting, the controller 414 provides data to be transmitted to each transmit/receive circuit 416 via the respective Data In signal lines. Each circuit incorporates a correlator configured with a unique function (or code) thus preventing interference between the signals generated. The resulting plurality of N signals are combined by the RF power combiner/splitter 418. The combined signal is then processed by the transmit RF front end circuit and transmitted via antenna 428.

Optionally, the combined signal can be upconverted using a mixing circuit similar to that of the transmit RF front end circuit 26 (FIG. 20) before being amplified and input to the antenna.

In the receive path, the received signal is fed from the antenna through the antenna interface 426 to the receive RF front end circuit 424. Likewise in the receive direction, the signal received form the antenna can be optionally downconverted to the IF frequency using a circuit similar to that of the receive RF front end circuit 32 (FIG. 21) before being input to Tx/Rx switch 42Q. The signal is then split by RF power splitter/combiner 418 into N signals. The received signal is input to a correlator in each transmit/receive circuit which functions to output a pulse in accordance with the function configured therein. The pulse is input to individual peak detectors in each receive circuit to generate 'N' Rx Out signals. The resulting 'N' Rx Out signals are input to the controller which generates the Data Out signals sent to the host.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein.

Accordingly, it will be appreciated that all suitable variations, modifications and equivalents may be resorted to, falling within the spirit and scope of the present invention.

What is claimed is:

1. A direct sequence spread Spectrum radio frequency (RF) modem, comprising:
   a pulse generator adopted to generate a shaped pulse from an Intermediate Frequency (IF) oscillator signal having an IF frequency, said pulse generator comprising a first pulse shaping circuit adapted to shape the contour of said shaped pulse;
   a pulse, spreader adapted to spread said shaped pulse with a spreading code sequence waveform so as to generate a spread pulse;
   a transmitter circuit including an upconverter for mixing said spread pulse with a local oscillator (LO) signal having an LO frequency so as to generate a spread spectrum transmission signal at an RF frequency;
   a receiver circuit including a downconverter for mixing a received signal with said LO signal so as to generate a reactivated spread pulse at said IF frequency;
   a correlator adapted to de-spread said received spread pulse in accordance with said code sequence so as to generate a correlator signal; and
   a detector adapted to generate an output signal in response to said correlator signal.

2. The modem according to claim 1, wherein said IF oscillator signal and said LO signal are generated by an oscillator circuit updated to utilize a single frequency source.

3. The modem according to claim 2, wherein said oscillator circuit comprises:
   said frequency source;
   a first frequency doubler connected to said frequency source; and
   a second frequency doubler connected to the output of said first frequency doubler.

4. The modem according to claim 2, wherein said frequency source comprises a surface acoustic wave (SAW) resonator.

5. The modem according to claim 2, wherein said frequency source comprises a surface acoustic wave (SAW) resonator tuned to 488 MHz.

6. The modem according to claim 1, wherein:
   a single surfaced acoustic wave (SAW) resonator is adapted to generate said IF oscillator signal and said LO oscillator signal;
   said pulse spreader and said correlator share the same Surface acoustic wave (SAW) correlator adapted to be used hair duplex for transmission and receiving; and
   wherein said SAW resonator and said SAW correlator are constructed on the same monolithic substrate.

7. The modem according to claim 1, wherein said IF frequency is 488 MHz.

8. The modem according to claim 1, wherein said LO frequency is 1952 MHz.

9. The modem according to claim 1, wherein said RF frequency is adapted to be in the 2.4 GHz Industrial Scientific Medial (ISM) band of frequencies.

10. The modem according to claim 1, wherein said pulse generator comprises a gating mechanism for gating said IF oscillator signal in accordance with input data to be transmitted.

11. The modem according to claim 1, further comprising a switching mechanism adapted to gate the: output of said pulse generator and the output of said pulse spreader in an inverse relationship to each other, whereby when said pulse generator is enabled, said pulse spreader output is not and vice versa.

12. The modem according to claim 1, wherein said pulse spreader comprises a second pulse shaping circuit operative to smooth the transitions of said spread pulse.

13. The modem according to claim 1, wherein said first pulse shaping circuit adapted to generate said pulse contour comprising a first portion that linearly ramps the amplitude of said pulse from a low to a high value and a second portion that linearly ramps the amplitude of said pulse from a high to a low value.

14. The modem according to claim 1, wherein said pulse spreader comprises a surface acoustic wave (SAW) matched filter.

15. The modem according to claim 1, wherein said spreading code sequence comprises a Barker code series sequence.

16. The modem according to claim 1, wherein said spreading code sequence comprises a 13-chip Barker sequence (1, 1, 1, 1, 1, −1, −1, 1, 1, −1, 1, −1, 1).

17. The modem according to claim 1, wherein said transmitter circuit comprises:
    an IF amplifier for amplifying said spread pulse;
    said upconverter for mixing said spread pulse with a LO signal;
    an RF power amplifier for amplifying said spread spectrum transmission signal; and
    an antenna coupled to the output of said output RF power amplifier.

18. The modem according to claim 1, wherein said receiver circuit comprises:
    an antenna adapted to receive RF signals;
    a first low noise amplifier (LNA) coupled to said antenna;
    said downconverter for mixing said received signal with said LO oscillator signal; and
    a second low noise amplifier for amplifying the output of said downconverter.

19. The modem according to claim 1, wherein said correlator means comprises a surface acoustic wave (SAW) matched filter/correlator.

20. The modem according to claim 19, wherein said SAW matched filter/correlator is configured with a Barker code series sequence.

21. The modern according to claim 20, wherein said Barker oxide series sequence comprises a 13-chip Barker sequence {1, 1, 1, 1, 1, −1, −1, 1, 1, −1, 1, −1, 1}.

22. The modem according to claim 1, wherein said spreading means and said correlator means share a surface acoustic wave (SAW) correlator adapted to be used half duplex for transmission and receiving.

23. The modem according to claim 1, wherein said detector comprises:
    a slow peak detector adapted to generate a slowly varying reference signal in accordance with said correlator signal;
    a fast peak detector adapted to track the envelope of said correlator signal and to generate a detection signal therefrom; and
    a decision circuit adapted to generate said output signal by comparing said detection signal against said reference signal.

24. A method of modulating and demodulating a direct sequence spread spectrum signal, said method comprising the steps of:

generating a shaped pulse from an intermediate Frequency (IF) oscillation signal having an IF frequency, wherein the contours of said shaped pulse are shaped;

spreading said shaped pulse with a spreading code sequence waveform and generating a spread pulse therefrom;

mixing said spread pulse with a local oscillator (LO) signal having an LO frequency and generating therefrom a spread spectrum transmission signal at an RF frequency;

mixing a received signal with said LO oscillator signal and generating therefrom a received spread pulse at said IF frequency;

de-spreading said spread spectrum transmission signal in accordance with said code sequence and generating a correlator signal therefrom; and detecting an output signal in response to said correlator signal.

25. The method according to claim 24, wherein said IF oscillator signal and said LO signal are generated utilizing a single frequency source.

26. The method according to claim 24, wherein said IF frequency is 488 MHz.

27. The method according to claim 24, wherein said LO frequency is 1952 MHz.

28. The method according to claim 24, wherein said RF frequency is adapted to be in the 2.4 GHz in Industrial Scientific Medial (ISM) band of frequencies.

29. The method to claim 24, wherein said step of generating a pulse comprises gating said IF oscillator signal in accordance with input data to be transmitted.

30. The method according to claim 24, further comprising the step of gating the output of said pulse generator and the output of said pulse spreader in an inverse relationship to each other, whereby when said pulse is generated, said spread pulse is not and vice versa.

31. The method of claim 24, wherein said step of spreading comprises the step of smoothing the transitions of said spread pulse whereby the frequency content of said spread pulse is reduced.

32. The pulse according to claim 24, wherein said step of shaping said pulse comprises shaping said pulse such that the amplitude of said pulse in a first portion is linearly ramped from a low to a high value, and in a second portion the pulse amplitude is linearly ramped from a high back to a low value.

33. The method according to claim 24, wherein said spreading code sequence comprises a Barker code series sequence.

34. The method according to claim 24, wherein said spreading code sequence comprises a 13-chip Barker sequence {1, 1, 1, 1, 1, −1, −1, 1, 1, −1, 1, −1, 1}.

35. The method according to claim 24, wherein said step of spreading and de-spreading share the same surface acoustic wave (SAW) correlator adapted to be used half duplex for transmission and receiving.

36. The method according to claim 24, wherein said step of detecting an output signal, comprises the steps of:

generating a slowly varying reference signal in accordance with said correlator signal;

tracking the envelope of said correlator signal and generating a detection signal therefrom; and generate said output signal by comparing said detection signal against said reference signal.

37. A On/Off Keying (OOK) direct sequence spread spectrum radio frequency (RF) transceiver, comprising:

an input circuit for generating a fixed duration data input signal in accordance with input data to be transmitted; and an RF modem comprising:

a pulse generator adapted to generate a shaped pulse in response to said data input signal from an Intermediate Frequency (IF) oscillator signal having an IF frequency, said pulse generator comprising a first pulse shaping circuit adapted to shape the contour of said shaped pulse;

a pulse spreader adapted to spread said shaped pulse with a spreading code sequence waveform so as to generate a spread pulse;

a transmitter circuit including an upconverter for mixing said spread pulse with a local oscillator (LO) signal having an LO frequency so as to generate a spread spectrum transmission signal at an RF frequency;

a receiver circuit including a downconverter for mixing a received signal with said LO oscillation signal so as to generate a received spread pulse at said IF frequency;

a correlator adapted to de-spread said spread spectrum transmission signal in accordance with said code sequence so as to generate a correlator signal; and a detector adapted to generate a data output signal in response to said correlator signal.

38. A pulse Width Modulation (PWM) direct sequence spread spectrum radio frequency (RF) transceiver, comprising:

an input circuit for generating a pulse width modulated data input signal in accordance with an analog input signal to be transmitted;

an RF modem comprising:

a pulse generator adapted to generate a shaped pulse in response to said data input signal from an Intermediate Frequency (IF) oscillator signal having an IF frequency, said pulse generator comprising a first pulse shaping circuit adapted to shape the contour of said shaped pulse;

a pulse spreader adapted to spread said shaped pulse with a spreading code sequence waveform so as to generate a spread pulse;

a transmitter circuit including an upconverter for mixing said spread pulse with a local oscillator (LO) signal having an LO frequency so as to generate a spread spectrum transmission signal at an RF frequency;

a receiver circuit including a downconverter for mixing a received signal with said LO oscillator signal so as to generate a received spread pulse at said IF frequency;

a correlator adapted to de-spread said spread spectrum transmission signal in accordance with said code sequence so as to generate a correlator signal;

a detector adapted to generate an output signal in response to said correlator signal; and an output circuit operative to integrate said output signal so as to generate an analog output signal therefrom.

39. A pulse Position Modulation (PPM) direct sequence spread spectrum radio frequency (RF) transceiver, comprising:

an input circuit for generating a pulse position modulated data input signal in accordance with an analog input signal to be transmitted;

an RF modem comprising:
  a pulse generator adapted to generate a shaped pulse in response to said data input signal from an Intermediate Frequency (IF) oscillator signal having an IF frequency, said pulse generator comprising a first pulse shaping circuit adapted to shape the contour of said shaped pulse:
  a pulse spreader adapted to spread said shaped pulse with a spreading code sequence waveform so as to generate a spread pulse;
  a transmitter circuit including an upconverter for mixing said spread pulse with a local oscillator (LO) signal having an LO frequency so as to generate a spread spectrum transmission signal at an RF frequency;
  a receiver circuit including a downconverter for mixing a received signal with said LO oscillator signal so as to generate a received spread pulse at said IF frequency;
  a correlator adapted to de-spread said spread spectrum transmission signal in accordance with said code sequence so as to generate a correlator signal;
  a detector adapted to generate an output signal in response to said correlator signal; and
an output circuit operative to threshold said output signal against a ramp function so as to generate an analog output signal therefrom.

40. A direct sequence spread spectrum radio frequency (RF) modem, comprising:
  an oscillator adapted to generate an Intermediate Frequency (IF) oscillator signal and a Local Oscillator (LO) signal;
  a plurality of N transmit/receive circuits, each said transmit/receive circuit comprising:
    a pulse generator adapted to generate a shaped pulse from said IF oscillator signal, said pulse generator comprising a first pulse shaping circuit adapted to shape the contour of said shaped pulse;
    a pulse spreader adapted to spread said shaped pulse with a spreading code sequence waveform so as to generate a spread pulse;
    a correlator adapted to de-spread said spread pulse signal in accordance with said code sequence so as to generate a correlator signal;
    a detector adapted to generate an output signal in response to said correlator signal;
  wherein the correlator in each transmit/receive circuit is configured with a unique function substantially orthogonal to functions in other correlators;
  means for combining and transmitting the N spread pulse signals generated by said N transmit/receive circuits as a combined transmission signal;
  a transmitter circuit including an upconverter for mixing said spread pulse with said LO signal so as to generate a spread spectrum transmission signal at an RF frequency;
  means for receiving and splitting said combined transmission signal into N receive signals;
  a receiver circuit including a downconverter for mixing a received signal with said LO signal so as to generate a received spread pulse at said IF frequency; and
  wherein N is a positive integer.

41. The modem according to claim 40, wherein said oscillator comprises:
  a frequency source;
  a first frequency doubler connected to said frequency source; and
  a second frequency doubler connected to the output of said first frequency doubler.

42. The modem according to claim 41, wherein said frequency source comprises a surface acoustic wave (SAW) resonator.

43. The modem according to claim 41, wherein said frequency source comprises a surface acoustic wave (SAW) resonator tuned to 488 MHz.

44. The modem according to claim 40, wherein:
  a single surface acoustic wave (SAW) resonator is adapted to generate said IF oscillator signal and said LO oscillator signal;
  said pulse spreader and said correlator share the same surface acoustic wave (SAW) correlator adapted to be used half duplex for transmission and receiving; and
  wherein said SAW resonator and said SAW correlator are constructed on the same monolithic substrate.

45. The modem according to claim 40, wherein said IF frequency is 488 MHz.

46. The modem according to claim 40, wherein said LO frequency is 1952 MHz.

47. The modem according to claim 40, wherein said RF frequency is adapted to be in the 2.4 GHz Industrial Scientific Medial (ISM) band of frequencies.

48. The modem according to claim 40, wherein said pulse generator comprises a gating mechanism for gating said IF oscillator signal in accordance with input data to be transmitted.

49. The modem according to claim 40, further comprising a switching mechanism adapted to gate the output of said pulse generator and the output of said pulse spreader in an inverse relationship to each other, whereby when said pulse generator is enabled, said pulse spreader output is not and vice versa.

50. The modem according to claim 40, wherein said pulse spreader comprises a second pulse shaping circuit operative to smooth the transition of said spread pulse.

51. The modem according to claim 40, wherein said pulse shaping circuit adapted to generate said pulse contour comprising a first portion that linearly ramps the amplitude of said pulse from a low to a high value and a second portion that linearly ramps the amplitude of said pulse from a high to a low value.

52. The modem according to claim 40, wherein said pulse spreader comprises a surface acoustic wave (SAW) matched filter.

53. The modem according to claim 40, wherein said spreading code sequence comprises a Barker code series sequence.

54. The modem according to claim 40, wherein said transmitter circuit comprises:
  an IF amplifier for amplifying said spread pulse;
  said upconverter for mixing said spread pulse with said LO signal;
  an RF power amplifier for amplifying said spread spectrum transmission signal; and
  an antenna coupled to the output of said output RF power amplifier.

55. The modem according to claim 40, wherein said receiver circuit comprises:
  an antenna adapted to receive RF signals;
  a first low noise amplifier (LNA) coupled to said antenna;

said downconverter for mixing said received signal with said LO oscillator signal; and a second low noise amplifier for amplifying the output of said downconverter.

56. The modem according to claim 40, wherein said correlator means comprises a surface acoustic wave (SAW) matched filter/correlator.

57. The modem according to claim 56, wherein said SAW matched filter/correlator is configured with a Barker code series sequence.

58. The modem according to claim 40, wherein said spreading means and said correlator means share a surface acoustic wave (SAW) correlator adapted to be half duplex for transmission and receiving.

59. The modem according to claim 40, wherein said detector comprises:

a slow peak detector adapted to generate a slowly varying reference signal in accordance with said correlator signal;

a fast peak detector adapted to track the envelope of said correlator signal and to generate a detection signal therefrom; and a decision circuit adapted to generate said output signal by comparing said detection signal against said reference signal.

* * * * *